United States Patent
Farooq

(10) Patent No.: US 12,057,739 B2
(45) Date of Patent: Aug. 6, 2024

(54) REVIVED REPULSION (RR) MAGNETIC CONFIGURATION

(71) Applicant: Umer Farooq, Multan (PK)

(72) Inventor: Umer Farooq, Multan (PK)

( * ) Notice: Subject to any disclaimer, the term of this patent is extended or adjusted under 35 U.S.C. 154(b) by 89 days.

(21) Appl. No.: 17/352,314

(22) Filed: Jun. 20, 2021

(65) Prior Publication Data

US 2022/0407373 A1 Dec. 22, 2022

(51) Int. Cl.
*H02K 1/24* (2006.01)
*H02K 1/2706* (2022.01)
*H02K 21/26* (2006.01)
*H02K 21/28* (2006.01)
*H02K 23/04* (2006.01)

(52) U.S. Cl.
CPC .......... *H02K 1/2706* (2013.01); *H02K 21/26* (2013.01); *H02K 21/28* (2013.01); *H02K 23/04* (2013.01)

(58) Field of Classification Search
CPC ........ H02K 1/2706; H02K 1/272; H02K 1/17; H02K 23/04; H02K 21/28; H02K 21/26; H02K 1/2746; H02K 37/18; H02K 1/24
USPC .......................................................... 310/49
See application file for complete search history.

(56) References Cited

U.S. PATENT DOCUMENTS

| | | | | |
|---|---|---|---|---|
| 4,322,648 A * | 3/1982 | Ray | ...................... | H02K 1/2746 310/156.55 |
| 5,258,697 A * | 11/1993 | Ford | ...................... | B60L 50/60 318/400.38 |
| 5,304,882 A * | 4/1994 | Lipo | ...................... | H02K 21/16 310/410 |
| 5,552,653 A * | 9/1996 | Nose | ..................... | H02K 19/103 310/263 |
| 5,710,499 A * | 1/1998 | Carvajal | ................... | H02P 8/38 310/49.01 |
| 2009/0072649 A1* | 3/2009 | Rottmerhusen | ........ | H02K 29/03 310/156.32 |
| 2013/0207498 A1* | 8/2013 | Kusase | .................... | H02K 1/16 310/156.01 |
| 2014/0217848 A1* | 8/2014 | Jurkovic | ................. | B32B 33/00 310/156.53 |
| 2016/0365756 A1* | 12/2016 | Li | ........................... | H02K 15/02 |

(Continued)

*Primary Examiner* — Tran N Nguyen
*Assistant Examiner* — Masoud Vaziri
(74) *Attorney, Agent, or Firm* — Lambert Shortell & Connaughton; David J. Connaughton, Jr.; Justin P. Tinger

(57) ABSTRACT

This is a novel magnetic configuration that is to be used to build extra efficient PM motors. This magnetic configuration uses mono polarities of permanent magnet as field-poles instead of dipolar field-poles configuration. Armature teeth are built, energized and used very differently in this magnetic configuration. This configuration revitalizes repulsive force three times inside a running PM motor without using more than usual current. Revitalized repulsive force allows using very strong permanent magnets, which produces heavy attractive force in the same running motor. The revitalized repulsive force along with the heavy attractive force produces extra output power in the motor at no-cost. This magnetic configuration is self-sufficient and unparalleled. It could only be implanted in new designs of PM motors. This magnetic configuration has been built around new experimental findings. The functions of three newly invented electrical machines including a fully-functional prototype validate this magnetic configuration.

10 Claims, 34 Drawing Sheets

(56) References Cited

U.S. PATENT DOCUMENTS

2016/0365757 A1* 12/2016 Li ........................ H02K 21/16
2019/0207438 A1* 7/2019 Zhang .................... B60L 50/60

* cited by examiner

FIG. 9

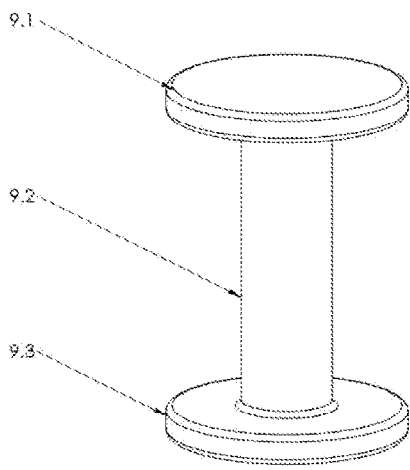

FIG. 10

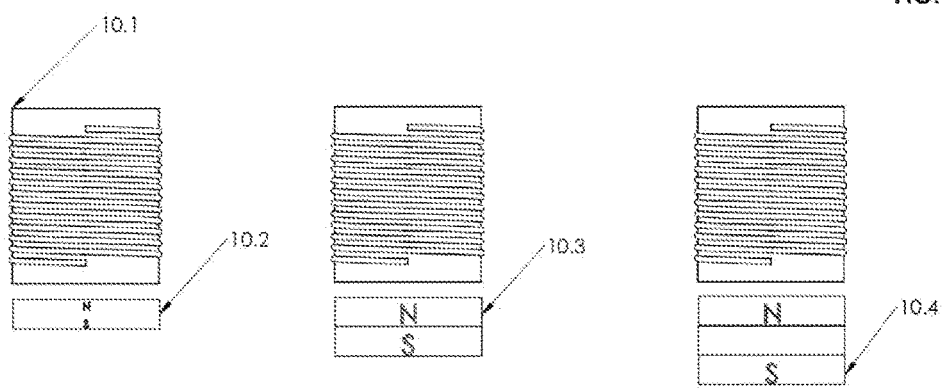

FIG. 11

| ELECTROMAGNET: | THE SAME | | | | | | | | |
|---|---|---|---|---|---|---|---|---|---|
| PERMANENT MAGNETS: | SAME AS GIVEN IN TABLE 1 | | | | | | | | |
| EXPERIMENT NO #. | INPUT WATT-SECOND FOR REPULSION | OUTPUT REPULSION POWER | EFFICIENCY OF CURRENT FOR REPULSION | INPUT WATT-SECOND FOR ATTRACTION | OUTPUT ATTRACTION POWER | EFFICIENCY OF ATTRACTION | TOTAL INPUT | TOTAL OUTPUT | EFFICIENCY OF COMPLETE CYCLE OF REPULSION AND ATTRACTION |
| 1 | 0.41736 | 0.07503 | 0.17977 | 0.41736 | 0.16231 | 0.38889 | 0.4173 X 2 = 0.8346 | 0.07503 + 0.16231 = 0.23734 | 0.23734/0.8346 = 0.28437 |
| 2 | 0.58464 | 0.08575 | 0.14667 | 0.58464 | 0.34825 | 0.59566 | 0.5846 X 2 = 1.1692 | 0.08575 + 0.34825 = 0.434 | 0.434/1.1692 = 0.37119 |
| 3 | 0.64638 | 0.10004 | 0.15476 | 0.64638 | 0.61045 | 0.94441 | 0.6463 X 2 = 1.2926 | 0.10004 + 0.61045 = 0.71049 | 0.71049/1.2926 = 0.54965 |

FIG. 12

| ELECTROMAGNET: | THE SAME | | | | | | |
|---|---|---|---|---|---|---|---|
| EXPERIMENT NO #. | NUMBERS OF PERMANENT MAGNETS | INPUT WATT-SECOND FOR REPULSION | OUTPUT REPULSION POWER | EFFICIENCY OF CURRENT FOR REPULSION | OUTPUT ATTRACTION POWER OF PERMANENT MAGNET ONLY (WITHOUT CURRENT) | TOTAL OUTPUT | EFFICIENCY OF COMPLETE CYCLE OF REPULSION AND ATTRACTION |
| 1 | ONLY ONE SATURATED PERMANENT MAGNET | 0.41736 | 0.07503 | 0.17977 | 0.075 | 0.07503 + 0.07503 = 0.150 | 0.359 |
| 2 | TWO SATURATED PERMANENT MAGNETS WERE ADDED TOGETHER | 0.58464 | 0.08575 | 0.14667 | 0.176 | 0.176 + 0.085 = 0.262 | 0.448 |
| 3 | THREE SATUREATED PERMANENT MAGENTS WERE ADDED TOGETHER | 0.64638 | 0.10004 | 0.15476 | 0.314 | 0.10004 + 0.314 = 0.414 | 0.641 |

FIG. 13

| ELECTROMAGNET: | THE SAME | | | | | | | | |
|---|---|---|---|---|---|---|---|---|---|
| PERMANENT MAGNETS: | SAME AS GIVEN IN TABLE 1 | | | | | | | | |
| EXPERIMENT NO #. | INPUT WATT-SECOND FOR REPULSION | OUTPUT REPULSION POWER | EFFICIENCY OF CURRENT FOR REPULSION | INPUT WATT-SECOND FOR ATTRACTION | OUTPUT ATTRACTION POWER OF CURRENT ONLY | EFFICIENCY OF ATTRACTION | TOTAL INPUT | TOTAL OUTPUT | EFFICIENCY OF CURRENT APPLIED TO A COMPLETE CYCLE OF REPULSION AND ATTRACTION |
| 1 | 0.41736 | 0.07503 | 0.17977 | 0.41736 | 0.08728125 | 0.20912 | 0.4173 X 2 = 0.8346 | 0.07503 + 0.08728 = 0.16231 | 0.16231/0.8346 = 0.19447 |
| 2 | 0.58464 | 0.08575 | 0.14667 | 0.58464 | 0.1715 | 0.29334 | 0.5846 X 2 = 1.1692 | 0.08575 + 0.1715 = 0.25725 | 0.25725/1.1692 = 0.22002 |
| 3 | 0.64638 | 0.10004 | 0.15476 | 0.64638 | 0.29604 | 0.45799 | 0.6463 X 2 = 1.2926 | 0.10004 + 0.29604 = 0.39608 | 0.39608/1.2926 = 0.30642 |

FIG. 14

| EXPERIMENT NO #. | EFFICIENCIES OF EXPERIMENTS DURING WHICH CUREENT WAS APPLED FOR BOTH REPULSION AND ATTRACTION (FROM TABLE 1) | EFFICIENCIES OF EXPERIMENTS DURING WHICH CUREENT WAS APPLIED FOR REPULSION ONLY (FROM TABLE 2) | EFFICIENCIES OF CURRENT ONLY (FROM TABLE 3) |
|---|---|---|---|
| 1 | 0.284 | 0.359 | 0.194 |
| 2 | 0.371 | 0.448 | 0.220 |
| 3 | 0.549 | 0.641 | 0.306 |
| AVERAGE EFFICIENCY | 0.401 | 0.482 | 0.24 |

FIG. 23

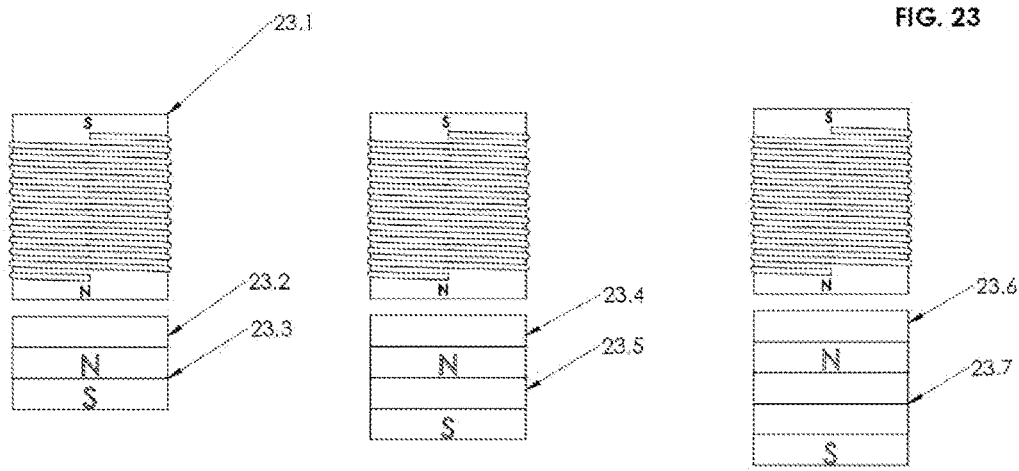

FIG. 24

| PM | EXPERIMENT NO #. | INPUT WATT-SECOND FOR REPULSION | OUTPUT REPULSION POWER | EFFICIENCY OF CURRENT FOR REPULSION | INPUT WATT-SECOND FOR ATTRACTION | TOTAL OUTPUT ATTRACTION POWER | EFFICIENCY OF CURRENT FOR ATTRACTION | TOTAL INPUT | TOTAL OUTPUT | EFFICIENCY OF A COMPLETE CYCLE OF REPULSION AND ATTRACTION |
|---|---|---|---|---|---|---|---|---|---|---|
| SATURATED PERMANENT MAGNET | 1 | 0.417 | 0.075 | 0.179 | 0.417 | 0.162 | 0.388 | 0.4173 X 2 = 0.8346 | 0.07503 + 0.162 = 0.237 | 0.237/0.8346 = 0.284 |
| | 2 | 0.584 | 0.085 | 0.146 | 0.584 | 0.348 | 0.595 | 0.5846 X 2 = 1.1692 | 0.08575 + 0.348 = 0.434 | 0.434/1.1692 = 0.371 |
| | 3 | 0.646 | 0.100 | 0.154 | 0.646 | 0.610 | 0.944 | 0.6463 X 2 = 1.2926 | 0.10004 + 0.610 = 0.710 | 0.710/1.2926 = 0.549 |
| PERMEABLE PERMEABILITY | 4 | 0.302 | 0.075 | 0.247 | 0.302 | 0.235 | 0.779 | 0.3028 X 2 = 0.60 | 0.075 + 0.235 = 0.310 | 0.310/0.60 = 0.513 |
| | 5 | 0.330 | 0.085 | 0.259 | 0.330 | 0.400 | 1.211 | 0.330 X 2 = 0.661 | 0.085 + 0.400 = 0.486 | 0.486/0.661 = 0.735 |
| | 6 | 0.432 | 0.100 | 0.231 | 0.432 | 0.569 | 1.318 | 0.432 X 2 = 0.864 | 0.100 + 0.569 = 0.669 | 0.669/0.864 = 0.775 |

FIG. 65

| INPUT ELECTRICAL POWER VOLTAGE X AMPERES = WATTS | TORQUE NEWTON-METER | RPM | OUTPUT MECHANICAL POWER (WATTS) | EFFICIENCY |
|---|---|---|---|---|
| 9.6 X 3.5 = 33.6 | 0.0768 | 1100 | 8.85 | 8.85/33.6 = 0.263 |
| 11.30 X 4 = 45.2 | 0.0864 | 1300 | 11.76 | 11.76/45.2 = 0.26 |
| 14.8 X 5.75 = 85.1 | 0.0987 | 1850 | 19.136 | 19.136/85.1 = 0.224 |

FIG. 66

| INPUT USED BY THE MOTOR THROUGH THE COMMUTATION SYSTEM | OUTPUT POWER OF THE MOTOR | TOTAL RESISTANCE WHEN MOTOR RUNS & RESISTANCE OF DIFFERENT PARTS & NET RESISTANCE | NEEDED INPUT WHEN THE OVER RESISTANCE CAUSED BY THE COMMUTATION IS REMOVED | EFFICIENCY |
|---|---|---|---|---|
| 9.6 X 3.5 = 33.6 | 8.85 WATTS | TOTAL RESISTANCE WHEN MOTOR RUNS = COIL RESISTANCE= 0.25 COMMUTATION RESISTANCE = 1.05 BACK EMF RESISTANCE = 1.44 TOTAL RESISTANCE = 2.742 | 5.915 VOLTS 3.5 AMPERES 20.7025 WATTS | 8.85/20.7025 = 0.4278 X 100 = 42.78% |

FIG. 67

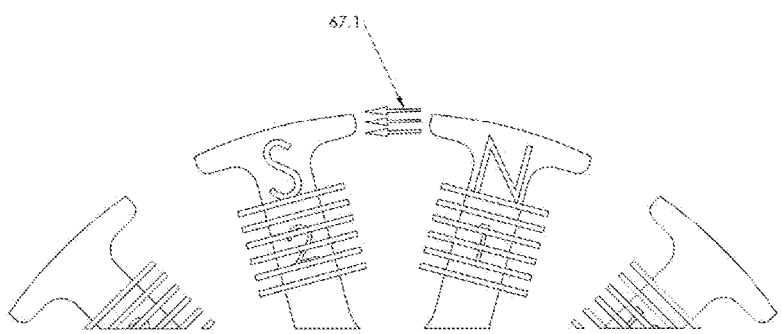

REVIVED REPULSION (RR) MAGNETIC CONFIGURATION

CROSS-REFERENCE TO RELATED APPLICATIONS

None of my applications are pending other than this US application and a PK application for the same invention

STATEMENT REGARDING FEDERALLY SPONSORED RESEARCH OR DEVELOPMENT

No grant was received for this invention from the US or another country

THE NAMES OF THE PARTIES TO A JOINT RESEARCH AGREEMENT

None. I am the sole inventor

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

Not applicable

STATEMENT REGARDING PRIOR DISCLOSURES BY THE INVENTOR OR A JOINT INVENTOR

Not applicable

BACKGROUND OF THE INVENTION

Field of the Invention

Permanent magnet electric motors

BRIEF SUMMARY OF THE INVENTION

This is a disruptive extra efficient magnetic configuration.
This magnetic configuration has been developed to be used to build new generation extra efficient permanent magnet motors.
This magnetic configuration revitalizes repulsive force in a PM motor without using additional current. Resultantly, the output power of the PM motor is highly strengthened at no-cost.
This magnetic configuration has been extracted from a series of new scientific findings.
The scientific findings have emerged from novel results of new experiments and from the novel functions of newly invented devices and fully functional electrical machines.
Applicability and workability of the whole magnetic configuration has been checked and validated by building a fully functional small motor that works on the whole magnetic configuration.
Present and immediately recoverable efficiency of this motor is at least double than the efficiency of present motors of the same power-range.

BRIEF DESCRIPTION OF THE SEVERAL VIEWS OF THE DRAWINGS

FIG. 9: the shape and size of the iron core of the electromagnet
FIG. 10: the chart of experiments when both attraction and repulsion happened with current
FIG. 11: the data of experiments when both attraction and repulsion happened with current
FIG. 12: the data of experiments when attraction happened without current (table)
FIG. 13: the efficiency of current after subtraction of PM attraction (table)
FIG. 14: the comparison of efficiencies of all three methods (table)
FIG. 23: magnetic configuration in experiments number 4, 5 and 6 (Chart)
FIG. 24: the data of experiment 4, 5 and 6 with the data of experiments 1, 2, 3 (table)
FIG. 65: present efficiency of the newly invented motor (table)

FIG. 66: the fractional recovery of immediately recoverable efficiency (table)

FIG. 67: the flow of flux between adjacent electromagnetic teeth

BACK GROUND RESEARCH

Summary of Back Ground Research

Figure 1:
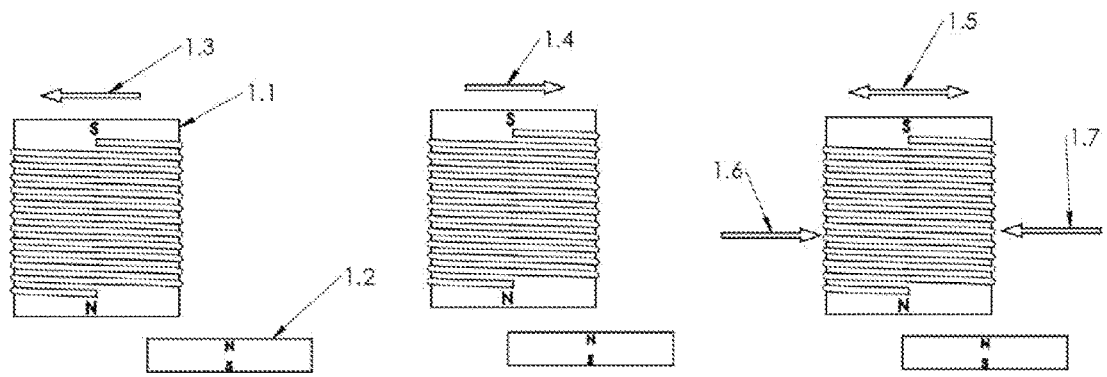
FIG. 1: strange movement of the electromagnet during repulsion

The Detection of Heavy Loss of Repulsion Force
a. The detection of a third pole during repulsion between an electromagnet and a permanent magnet
b. The negative effects of dipolar field-poles configuration in PM DC motors
The Recovery of the Lost Repulsion Force
a. Advanced experiments
b. Permeable permanent magnet
c. Equal-poles DC motor
d. Three-fold magnetic circuit
e. Like field pole actuator Summary of Back Ground Research This is a disruptive invention. However, this invention has not emerged from nowhere or thin air. This invention has emerged from a very long and deep experimental research.

A long experimental research was carried out to explore maximum limits of attractive and repulsive forces between an electromagnet and a permanent magnet. This research proved that heavy amount of repulsion force is wasted between an electromagnet and a permanent magnet. This research also proved that the lost repulsion force can be recovered and used to highly strengthen output of a PM motor without using more input power.

The purpose of the description of background research is to provide full basis of the invention (the configuration) so that the configuration can be implanted easily and appropriately in motors.

A number of experiments have been carried out and many new devices have been developed during the research. The introductions and results of the experiments and the functions of the devices are summarized here.

The Detection of a Third Pole During Repulsion Between an Electromagnet and a Permanent Magnet This research tells apart the response of an iron-core solenoid definitely from that of an air-core solenoid when they face the like pole of a permanent magnet.

The factors that appeared during this research may seem extremely unusual and strange, but it does not seem possible to falsify them because this research is fully supported by the results of very simple, self-evident, and repeatedly repeatable experiments. It seems that these insightful experiments have never been carried out.

In the past, I set an iron core electromagnet and a permanent magnet to repel each other. To my surprise, the like poles repelled each other to some distance at first, and then attracted each other forcefully instead of repelling. This phenomenon seemed unbelievable because everyone knows that like poles never attract each other. I repeated the same action using different iron core electromagnets against different permanent magnets. The results remained always the same as the first result.

5 years ago, I put a question on Quora, "why repulsion is weak between an electromagnet and a permanent magnet?"

Respected Mr. Eli Pasternak (on quora) answered, "While attempting to create a repulsive force by setting the proper polarity of the current in the electromagnet, the permanent magnet is always attracting the iron core inside the electromagnet. If you take a strong magnet and an air core electromagnet, the repulsive force will be equal to the attractive force."

This answer not only supported the existence of the attractive force during the repulsion but also distinguished the function of an iron core solenoid from that of an air-core solenoid when they face a permanent magnet.

As like-poles can never attract each other, it was hypothesized that 'some part of the iron-core was magnetized by the magnetizing field of the current in the coil' which repelled the permanent magnet, while the rest of the iron core remained unsaturated because the magnetizing field of the current was not strong enough to saturate the whole iron core; the same unsaturated part of the core was attracted by the permanent magnet.

As the permanent magnet first creates an unlike-pole in a magnetic material and then attracts it, the attracted part of the core became a third pole in the system.

As the attraction between the like poles was an opposing force, it should damage the repulsive force. Eventually, the overall repulsion should be smaller than that expected.

To check the hypotheses, single poles of one electromagnet and one permanent were repelled systematically. The results validated the hypotheses.

When the electromagnet was applied current, at first repulsive force was produced and the electromagnet moved away from the permanent magnet, and then a strange attractive force appeared automatically and the electromagnet moved back inevitably. At the end, the electromagnet stopped in half-crossed position, while the current remained continuously put-on.

Figure: 1

Summarized Results of the Research
1. Permanent magnet pulls unsaturated part of the iron core of an electromagnet back during repulsion; the attraction during repulsion damages repulsive force.
2. The flow of flux lines between unlike PM field-poles (through unsaturated part of the armature) brakes the rotation of the armature during expulsion of its teeth from the field poles.

Advanced Experiments

Previously described basic research resulted in 'permanent magnet pulls unsaturated part of an electromagnet back during repulsion; the attraction during repulsion damages repulsive force.'

To further explore the phenomenon, I carried out a series of advanced experiments on repulsive and attractive forces between an electromagnet and a permanent magnet. The results of the experiment proved that the wasted repulsive force is revivable.

A substantial amount of extra efficiency emerged through the results of the experiments. Repeatedly repeatable experiments verified emerging of this extra efficiency undeniably. Whenever both current (of electromagnet) and flux (of permanent magnet) were enhanced, efficiency jumped higher. Output must increase because of enhanced current and flux but from where did the extra efficiency come? I^2R loss increased as a result of increment in current so efficiency must drop but it increased instead!

The Results of Experiments when Both Attraction and Repulsion Happened with Current:
  a Same sized single poles of the electromagnet and the permanent magnet repelled and attracted each other forcefully. This simplest configuration avoided any unnecessary messing of 'B' lines.
  b. When higher efficiency was got, the flux of the permanent magnet pole was stronger and the current was higher.
  c. The degree of magnetization of the iron core of the electromagnet was higher because of the higher current. Unsaturated part of the electromagnet was reduced at the higher degree of magnetization. Reduced unsaturated permeability of the iron core and stronger permanent magnet allowed the extra efficiency to appear.
  d. In experiment 2, two permanent magnets were used instead of one. Double input must have been needed for repulsion in this case. Efficiency of experiment 2 must have remained nearly the same as that of experiment, 1; but the result was absolutely different.
  e. In the experiment 2, the electromagnet used a small amount of more input power than that was used by experiment 1, but pushed double amount of PM flux. Pushing double amount of PM flux resulted in achieving double attraction of PM. Efficiency jumped higher.
  f In all the above experiments, only single poles of electromagnets were used. So dipolar magnetic moment of the electromagnet did not appear fully in output power. Resultantly, total output power created during the experiment was very low.

The Results of Experiments when Attraction Happened without Current
  This experiment provided a heavy amount of output power of attraction without current. Resultantly, heavy amount of additional efficiency of a complete cycle was got in this experiment.
  Total output power of each of these experiments was a combination of output powers of both repulsion with current and attraction without current.
  Efficiencies of these experiments were higher than those of the experiments that comprised attraction-with-current.

The Results of Experiments when Attraction of Permanent Magnet was Subtracted
  The efficiency of current only was very low in comparison with the methods in which the attraction of permanent magnet was included in the calculations.
  Comparison of Efficiencies of all Three Methods
  Efficiency of current+PM flux was 67% to 100% more than the efficiency of current-only.

Permeable Permanent Magnet

The advanced experiments showed that at higher current plus higher permanent magnet flux, the efficiency of a magnetic interaction increased substantially. However, it is not always possible using of higher current level. To get extra efficiency at lower current, I carried out a thorough research. During the research a new kind of permanent magnet emerged. I have named this kind of permanent magnet as High Repulsion/permeable permanent magnet. Making process of this magnet was simple but function of the magnet proved to be very important.

Results
  The permeable permanent magnet produced double repulsion force than that was produced by an ordinary permanent magnet; while the attraction forces of both kinds of permanent magnet remained equal to each other.
  Permeability-added permanent magnet used lower input power and provided stronger output power in comparison with ordinary permanent magnet.
  Appropriateness of the quantity of permeability added to a permanent magnet is must.
  Higher repulsion allowed using of higher flux of permanent magnet. Higher flux provided higher attraction force during a complete cycle of repulsion and attraction.
  Higher repulsive and attractive forces produced extra output power at no cost.
  Average of the efficiencies of permeable permanent magnet was approximately 53% greater than that of ordinary permanent magnets.

Disadvantage

A permeable permanent magnet cannot show its full efficiency when it works in an unlike field-poles configuration. Flow of flux between unlike field-poles compels a reasonable amount of 'B' lines of permeable PM to act in attraction even when repulsion is desired. It damages repulsive force.

Equal Poles DC Motor that Showed Ever-Increasing Efficiency

A PMDC motor was built around the discoveries that were made during the experimental research. Basically two major findings from the research were used as the basis of this motor:
1. When interacting electromagnet was provided more current and stronger permanent magnet was used, efficiency of a magnetic cycle increased strongly.

2. When the same input for the same electromagnet was used to interact with each of permeable and saturated permanent magnet, the efficiency of a permeable permanent magnet greatly exceeded the efficiency of a saturated permanent magnet.

Result

When both current and PM flux were enhanced in this motor, efficiency increased accordingly, continuously and substantially. Recovery of the ever-increasing efficiency made this motor most important. Ever increasing efficiency meant that an unknown part of the efficiency still remained hidden. Improved models can recover the rest efficiency. Where this ever increasing efficiency is coming from?

Three-Fold Magnetic Circuit

The Results Got from Advanced Experiments Proved that:

'Efficiency of current+PM flux was 67% to 100% more than the efficiency of current-only. It was apparent that the permanent magnet created the additional efficiency. However, this matter was very important so the result had to be verified using a different method.

To fulfill this purpose a three-fold-magnetic circuit was developed.

Result

1. Application of the three-fold magnetic circuit produced 50% more efficiency than that of an ordinary magnetic configuration using the same amount of input electricity.
2. This result was in consistence with the findings from the advanced experiments and from the function of permeable magnet.
3. The extra efficiency of this actuator proved that the magnetic fields of electromagnet and permanent magnet can be combined appropriately even in a three-fold magnetic configuration. The proper combination will produce extra efficiency.

Like-Field-Poles Actuator

I inferred from the conclusion of the basic research (the detection of a third pole during repulsion) that if the flow of 'B' lines between unlike field-poles is discontinued, there will be no opposite polarity so there will be no braking effect. In absence of the flow of the flux, each of the permanent magnets would act with the armature individually, separately and independently. The elimination of the braking effect would strengthen the output of the motor without using more electric power.

Though the elimination of the opposite polarity would also reduce matching attractive force but this damage can easily be covered by using stronger permanent magnets. Independent like-poles of stronger magnets will interact with the armature forcefully without creating dipolar flow of flux. Consequently, heavy attraction would be got without producing braking effect.

Keeping the above discussion in mind, it was hypothesized 'if like-poles are used as field-poles in an electrical machine, then the machine will exhibit extra efficiency.

A rotary actuator was built to check the hypothesis.

Result

1. The weight of the rotor was (1600 grams) and it used 4 bearings to rotate. Too heavy rotor and friction loss of 4 bearings must have wasted a lot of output power. Besides the heavy losses, the net efficiency of this actuator did not seem less than 80% using only 0.60 watt input power.
2. This actuator enabled double usage of flux lines of a PM like field pole when it attracted an electromagnetic pole. Its flux lines joined the flux lines of the attracted electromagnetic pole and emitted from repelling electromagnetic pole. This action of 'B' lines strengthened the repulsion between the repelling field-pole and the electromagnetic pole.
3. Independent-field-poles magnetic configuration allowed using heavy PM flux because no flow of flux occurred between the heavy like-poles (The flow of flux between unlike field-poles brakes the rotation of the armature).

Present and potential efficiency of this actuator is an irrefutable proof of validation of independent (like) field pole configuration.

Independent-field-poles magnetic configuration allowed permeable PM field-poles to act properly during repulsion.

The Detection of Heavy Loss of Repulsion Force

Basic Research: The Detection of a Third Pole During Repulsion Between an Electromagnet and Permanent Magnet Sole investigator and author: Umer Farooq Overview This research tells apart the response of an iron-core solenoid definitely from that of an air-core solenoid when they face the like pole of a permanent magnet. The factors that appeared during this research may seem extremely unusual and strange, but it does not seem possible to falsify them because this research is fully supported by the results of very simple, self-evident, and repeatedly repeatable experiments. It seems that these insightful experiments have never been carried out.

In the past, I set an iron core electromagnet and a permanent magnet to repel each other. To my surprise, the like poles repelled each other to some distance at first, and then attracted each other forcefully instead of repelling. This phenomenon seemed unbelievable because everyone knows that like poles never attract each other. I repeated the same action using different iron core electromagnets against different permanent magnets. The results remained always the same as the first result. 5 years ago, I put a question on Quora, "why repulsion is weak between an electromagnet and a permanent magnet?"

Respected Mr. Eli Pasternak (on quora) answered, "While attempting to create a repulsive force by setting the proper polarity of the current in the electromagnet, the permanent magnet is always attracting the iron core inside the electromagnet. If you take a strong magnet and an air-core electromagnet, the repulsive force will be equal to the attractive force."

This answer not only supported the existence of the attractive force during the repulsion but also distinguished the function of an iron core solenoid from that of an air-core solenoid when they face a permanent magnet.

As like-poles can never attract each other, it was hypothesized that 'some part of the iron core was magnetized by the magnetizing field of the current in the coil' which repelled the permanent magnet, while the rest of the iron core remained unsaturated because the magnetizing field of the current was not strong enough to saturate the whole iron core; the same unsaturated part of the core was attracted by the permanent magnet.

As the permanent magnet first creates an unlike-pole in a magnetic material and then attracts it, the attracted part of the core became a third pole in the system.

As the attraction between the like poles was an opposing force, it should damage the repulsive force. Eventually, the overall repulsion should be smaller than that expected. To check the hypotheses, single poles of one electromagnet and one permanent were repelled systematically. The results validated the hypotheses.

When the electromagnet was applied current, at first repulsive force was produced and the electromagnet moved away from the permanent magnet, and then a strange attractive force appeared automatically and the electromagnet moved back inevitably. At the end, the electromagnet stopped in half-crossed position, while the current remained continuously put on. Figure: 1

FIG. 1.1: Electromagnet; FIG. 1.2: Permanent magnet; FIG. 1.3: Repulsion; FIG. 1.4: Attraction during repulsion; FIG. 1.5: Balance of both repulsive and attractive forces; FIG. 1.6: Attraction back during the balance; FIG. 1.7: Repulsion during the balance Conclusions Importance of Repulsion Force The attractive force of permanent magnets is free, but to achieve this free force, the magnet must first repel an object. We can get a specific amount of attractive force proportional to a specific amount of repulsive force.

The third pole severely damages the repulsive force. The damaged repulsion force allows recovering only partial attractive force. The output power of a complete magnetic cycle of repulsion and attraction is damaged ultimately.

The creation of a stronger repulsion force during a complete magnetic cycle of repulsion and attraction makes the cycle stronger. The output power of a motor comprises output powers of many complete magnetic cycles. Thus, stronger cycles assure stronger output of a motor.

The Root Cause of the Opposing Attraction Force

Prior-knowledge of electromagnetism seems to address "force between an air-core solenoid and a permanent magnet", and "force between an iron-core-solenoid and a permanent magnet" in the same way; while this research concludes that the natures of the magnetic poles of both kinds of solenoids are totally different. Provisionally, I named them perfect and imperfect magnetic poles.

Imperfect poles: Usually, iron-core solenoids are not designed to be saturated. Therefore, the solenoids contain some randomly aligned or loosely magnetized magnetic domains (when current is applied to the solenoid). The unaligned magnetic domains are always aligned by a permanent magnet. The polarities of these domains are always opposite to the interacting like-polarities of the iron-core solenoid and the permanent magnet.

Perfect poles: An air-core solenoid does not contain additional permeability (unsaturated iron), therefore, does not contain any non-aligned magnetic domains. A permanent magnet does not find any unsaturated part to attract. These poles may be named 'perfect poles'. There is no third pole during the repulsion between like perfect poles. Therefore, the repulsion force of perfect poles is always pure.

The Creation of Opposing Attraction Force in PM Motors

The opposing attractive force seems rarely known to physicists, but it is not unknown in motor technology. However, it is linked to unenergized armature teeth.

Respected Mr. Loren Rademacher, retired motor designer of GE, commented on my work at Quora as, "The effect of attraction between a magnet and an unenergized pole piece is a normal behavior in a PM motor During part of the rotation, the magnet pulls the pole in the direction of rotation; then, as the pole passes the magnet, the magnet tries to pull the pole back. Thus, there is a pulsating torque with no net average effect, and it can be ignored except for the vibrations and noise that it might introduce into the system. Motor designers call this effect 'cogging'."

My Inference

I inferred from the comment that the permanent magnet provides matching force when "the magnet pulls the pole in the direction of rotation", but this matching force is balanced (wasted) by the opposing force of attraction, which happens during the ejection of the unenergized teeth, "and then as the pole passes the magnet, the magnet tries to pull the pole back". In this way, a large amount of useful magnetic force is wasted.

In other words, low reluctance parts of an armature provide the PM flux a postern to flow between the unlike field poles. This flow causes an independent parallel opposite polarity against the desired polarity that is caused by the current in the coils.

The answer proves that the creation of the third pole is not limited to single poles. The third pole is created in dipolar magnetic systems, too.

This discussion implies that the permanent magnet acts alternatively in a motor like alternative-current. The work of the permanent magnet is canceled by the counterwork of the same permanent magnet.

Over-Strengthening of the Third Pole in Permanent Magnet Motors

The experiments were carried out using only one permanent magnet pole. It is apparent if an unlike pole of another permanent magnet is added on the spare side of the electromagnet, the 'B' lines of both permanent magnets would use the unsaturated part of the core as a path and would try to keep the electromagnet in the same position. Therefore, the flow of the 'B' lines would cause a great braking effect during the rotation of the electromagnet.

The third pole or opposite polarity would be doubled or so because of the flow of flux between unlike field poles. The opposing attraction force would ultimately be strengthened. The strengthened opposing attraction force would reduce the repulsion force severely. Figure: 2

Figure 2:
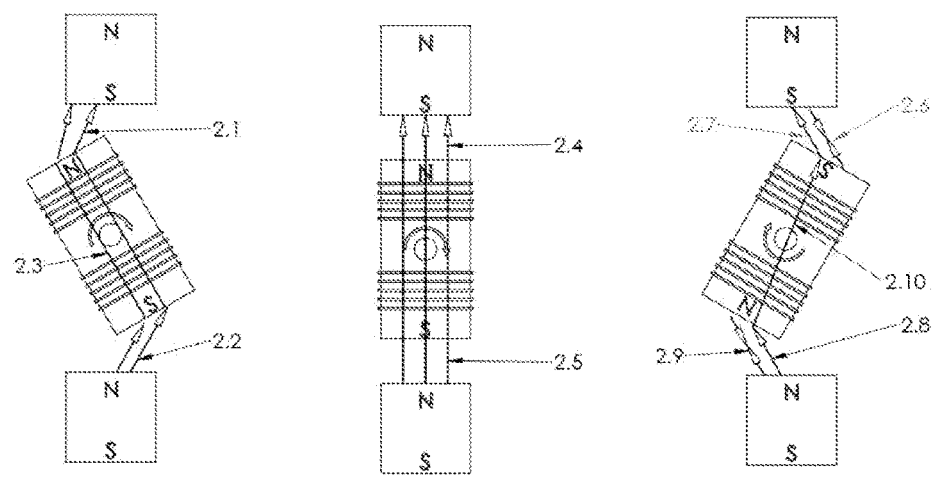
FIG. 2: doubling of the opposite polarity
Figure 3:
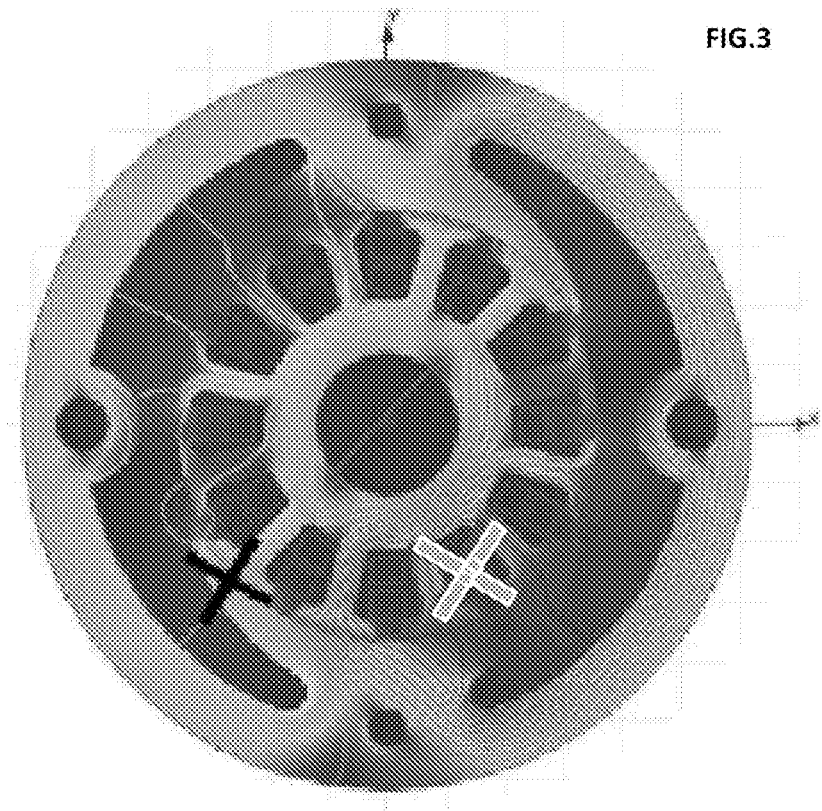
FIG. 3: the analysis of a two-pole PMDC motor simulation

FIGS. 2.1 & 2.2: Attraction between the electromagnet and two unlike permanent magnets poles; FIG. 2.3: Flow of flux through the core of the electromagnet; FIGS. 2.4 & 2.5: Full attraction between the electromagnet and permanent magnets; FIGS. 2.6 & 2.9: Repulsion between the electromagnet and permanent magnets; FIGS. 2.7 & 2.8: Attraction during repulsion; FIG. 2.10: Dipolar flow of flux of permanent magnet during repulsion Findings from Basic Research 1. Permanent magnet pulls unsaturated part of the iron core of an electromagnet back during repulsion; the attraction during repulsion damages repulsive force.
2. The flow of flux lines between unlike PM field-poles (through unsaturated part of the armature) brakes the rotation of the armature during expulsion of its teeth from the field-poles.

Full research has been published on Researchgate forum

The Negative Effects of Dipolar Field-Poles Configuration in PM DC Motor

Researcher: Umer Farooq

To check the negative effects of the flow of dipolar PM flux, the simulation of a PMDC motor was analyzed. Figure: 3

How is it possible? Why is half of the field pole (in red crossed area) almost free of lines of force? It is impossible. This portion must contain substantial amount of lines of force. Lines of force emanating from red crossed area of the field pole can never reach black crossed area because of circular shape of field pole and intervening un-energized armature teeth.

These Lines of force must penetrate into intervening un-energized armature teeth. This penetration must cause heavy attraction against the direction of rotation; hence this attraction is heavy opposing force.

This heavy opposing force must balance (waste) equivalent part of matching force. In simple words, enormous amount of magnetic force must be wasted because of production of the opposing force.

Experimental Proofs

Experiment 1

Figure 4:
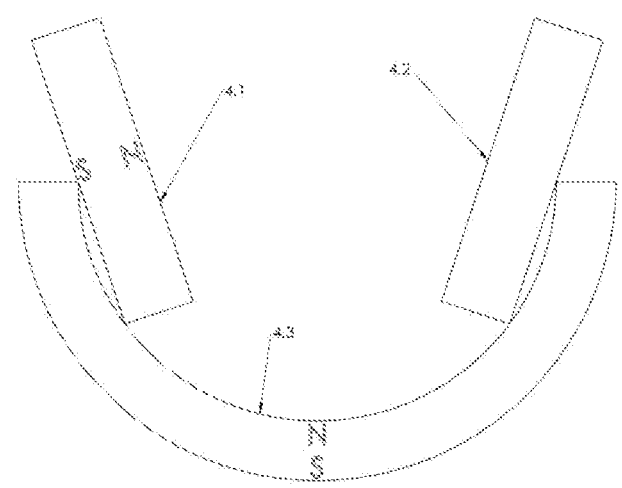
FIG. 4: the unused corner of a PM field-pole attracts a piece of iron forcefully

It is clearly experimental that when unlike pole of a powerful permanent magnet is attached to one corner of a field-pole; the other corner still attracts a piece of iron forcefully. Figure: 4: FIG. 4.1: Permanent magnet; FIG. 4.2: iron piece; FIG. 4.3: Permanent magnet field pole If most of 'B' lines of a field-pole concentrate on active corner, how other corner can attract iron forcefully?

Experiment 2 When two iron nails are attached to any single pole of a magnet, both nails repel each other as like poles repels each other. Figure: 5

Figure 5:
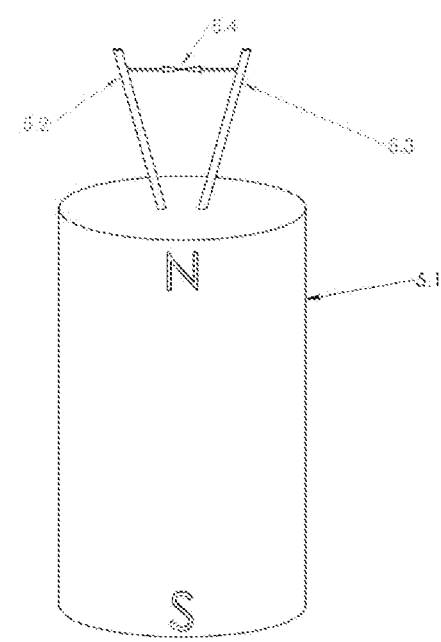
FIG. 5: two iron nails attached to any single pole of a magnet repel each other
Figure 6:
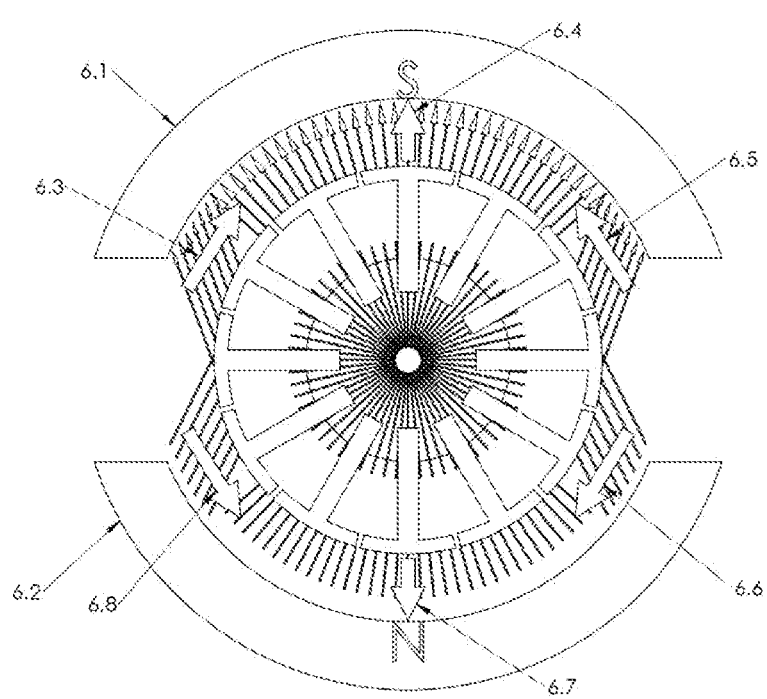
FIGS. 6 & 7: real pattern of lines of force and directions of forces in a PMDC motor

FIG. 5.1: Permanent magnet; FIG. 5.2: & FIG. 5.3: iron nails; FIG. 5.4: Repulsion between the iron nails The experiment results in that not only 'B' lines emanating from like poles of two permanent magnets repel each other but also 'B' lines emanating from the same pole of a permanent magnet repel each other. This is mutual repulsion of same pole flux lines.

Conclusion

If all the field lines have to reach the black circled area of the permanent magnet, the entire field lines have to lose their basic property of mutual repulsion. This is impossible.

The understanding represented by the simulation is totally flawed. This flawed understanding is constantly leading to wrong designs of PM DC motors.

PM field-poles pull unenergized armature teeth back during expelling of the teeth from the field poles. It brakes the rotation of the armature.

Real pattern of lines of force and directions of forces, Figure: 6 & 7

All big white arrows show the directions of forces created by the permanent magnet poles when a two-pole DC motor stand still.

Figure 7:
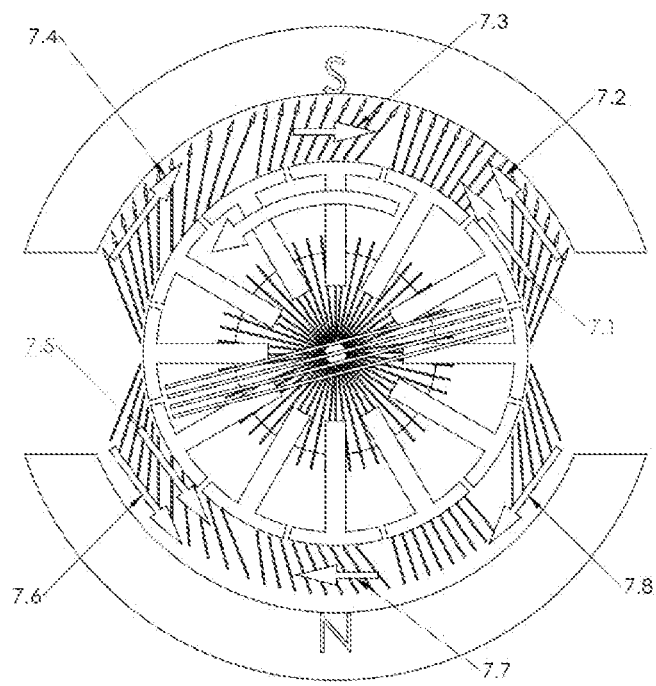

FIGS. 7.1, 7.3, 7.4, 7.5, 7.7, 7.8: Show the direction of force created by the permanent magnet field poles; FIGS. 7.2,7.6: Show the direction of force created by electricity The Recovery of the Wasted Repulsion Force Advanced Experiments Researcher: Umer Farooq Previously described basic research resulted in 'permanent magnet pulls unsaturated part of an electromagnet back during repulsion; the attraction during repulsion damages repulsive force.'

To further explore the phenomenon, I carried out a series of advanced experiments on repulsive and attractive forces between an electromagnet and a permanent magnet.

A substantial amount of extra efficiency emerged through the results of the experiments. Repeatedly repeatable experiments verified emerging of this extra efficiency undeniably. Whenever both current (of electromagnet) and flux (of permanent magnet) were enhanced, efficiency jumped higher. Output must increase because of enhanced current and flux but from where did the extra efficiency come? I^2R loss increased as a result of increment in current so efficiency must drop but it increased instead!

Experimental Devices Used in this Series of Experiments

Magnetic Power Measuring Device

Figure 8:
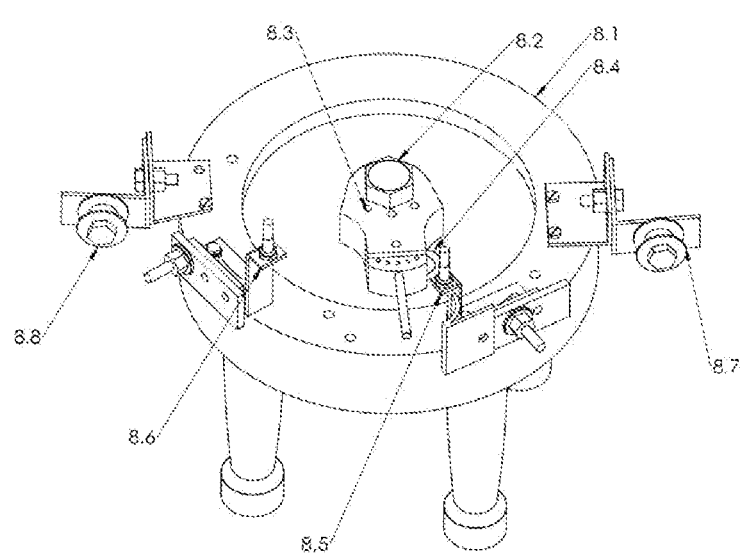
FIG. 8: Magnetic Power Measuring Device

I have developed a device. Using this device one electromagnet and one permanent magnet can repel or attract each other in a controlled situation. Using this device, necessary data of input and output of a repulsion or attraction interaction can be gathered. Efficiency of an interaction is calculated after an interaction is completed. Diagram of the device, Figure: 8 FIG. 8.1: Body; FIG. 8.2: Moving Shaft; FIG. 8.3: Electromagnet fixed under the rotating knob; FIG. 8.4: Permanent magnet field pole fixed on the body; FIG. 8.5, 8.6: Electronic sensors; FIG. 8.7, 8.8: Pulleys to support the mass a. This device measures mass carried, distance covered and time consumed by a magnetic interaction.

b. This device is made of aluminum.

c. A rotating shaft is fixed on two bearings in the center of the device.

d. An electromagnet can be installed on this shaft by help of a knob.

e. A permanent magnet can be fixed on the surface of the device.

f. The electromagnet moves over the magnet in accordance with attraction or repulsion force. Two sensors are installed on sideways of the fixed permanent magnet. These sensors are activated automatically when the electromagnet moves. An electronic circuit with a built-in watch records the time of an interaction.

g. Distance covered by an interaction is fixed. That is the distance between the sensors.

h. Two pulleys are installed on the sideways of the device. A bowl is fastened with the electromagnet. The bowl hangs on one of the pulleys in accordance with the attraction or repulsion interactions.

i. Appropriate mass is attached to the electromagnet. Mass carried by the electromagnet is the mass of an interaction.

Permanent Magnets

Three permanent magnets made of the same material: grade 33SH; size: D25 mm*d12 mm*2 mm; Magnetization: through 2 mm. (ring shape).

Electromagnet

In all the interactions only one and the same electromagnet interacted with all kinds of permanent magnets.

Specification: Material: soft iron; Weight of iron: 80.40 grams; Total length of iron core: 43 mm Material of coil: copper, Turns of wire: 992; Wire number: 30

Steady state resistance (R)=3.00 volts/00.20 ampere=15, Shape and size of iron core: Figure: 9 FIG. 9.1, 9.3: Side tablets; FIG. 9.2: Pillar between the tablets Method of an Experiment Permanent magnet is fixed into the hole on the surface of the device. Electromagnet is fixed in the rotatable knob (Actuator).

Interaction in Attraction Mode

Appropriate mass is put into the mass bowl.

The actuator is brought by hand in the fixed range of the electronic sensor B. Now the electromagnet is set automatically at a distance of 1 mm away from the permanent magnet. Sensor circuit is put on using line current. Watch is set on 0.00 of ¹⁄₁₀₀ second. Line current for electromagnet is put on. Direction of current is set for attraction.

(Attraction can happen without current).

As soon as the electromagnet-knob is released, sensor B is activated automatically and it puts-on the stopwatch.

The electromagnet moves and its face come exactly opposite to the face of permanent magnet. When the interaction is completed, sensor A is activated automatically and puts off the stopwatch.

Interaction in repulsion mood: Above process is reversed for repulsion.

Three Experiments

Three experiments were carried out on attraction and repulsion between an electromagnet and a permanent magnet.

Electromagnet and permanent magnet were interacted on the same magnetic power measuring device.

During the experiments, the same electromagnet was supplied different amounts of current.

Different amounts of flux of permanent magnets were used in each experiment. For this purpose more pieces of permanent magnet were added to the primary permanent magnet.

The same input was used for repulsion and attraction of an experiment.

Air gap between electromagnet and permanent magnet during all the three experiment remained fixed. This was 1 mm.

In each of the three experiments, the electromagnet and the permanent performed three inter actions:
Both of them repelled each other. Data was collected.
Both of them attracted each other without current. Data was collected.
Both of them attracted each other with current. Data was collected.

Data of all the Three Experiments when Attraction Happened with Current (Chart), Figure: 10

FIG. 10.1: Electromagnet; FIG. 10.2: One permanent magnet; FIG. 10.3: Two permanent magnets; FIG. 10.4: Three permanent magnets Table: data of experiments when both attraction and repulsion happened with current. Figure: 11

Table: data of experiments when attraction happened without current. Figure: 12

Table: data of experiments when both attraction and repulsion happened with current but attraction of permanent magnet was differently measured and subtracted. This table shows efficiency of current only. Figure: 13

Table: comparison of efficiencies of all three methods, Figure: 14 Results

The Results of Experiments when Both Attraction and Repulsion Happened with Current:
1. When higher efficiency was got, single poles of the electromagnet and the permanent magnet repelled and attracted each other independently. This simplest configuration avoided any unnecessary messing of 'B' lines.
2. When higher efficiency was got, same sized poles of the electromagnet and the permanent magnet repelled and attracted each other. Same sized cross sectional areas avoided any unnecessary messing of 'B' lines.
3. When higher efficiency was got, the flux of the permanent magnet pole was stronger.
4. When higher efficiency was got, the current was higher so the degree of magnetization of the iron core of the electromagnet was also higher.
5. Unsaturated part of the electromagnet was reduced at the higher degree of magnetization. Reduced unsaturated permeability of the iron core and stronger permanent magnet allowed the extra efficiency to appear.
6. In experiment 2, two permanent magnets were used instead of one. Double input must have been needed for repulsion in this case. Efficiency of experiment 2 must have remained nearly the same as that of experiment, 1; but the result was absolutely different.
7. In the experiment 2, the electromagnet used a small amount of more input power than that was used by experiment 1, but pushed double amount of PM flux. Pushing double amount of PM flux resulted in achieving double attraction of PM. Efficiency jumped higher.
8. In all the above experiments, only single poles of electromagnets were used. So dipolar magnetic moment of the electromagnet did not appear fully in output power. Resultantly, total output power created during the experiment was very low.

The Results of Experiments when Attraction Happened without Current

This experiment provided a heavy amount of output power of attraction without current. Resultantly, heavy amount of additional efficiency of a complete cycle was got in this experiment.

Total output power of each of these experiments was a combination of output powers of both repulsion with current and attraction without current.

Efficiencies of these experiments were higher than those of the experiments that comprised attraction-with-current.

The Results of Experiments when Attraction of Permanent Magnet was Subtracted

The efficiency of current only was very low in comparison with the methods in which permanent magnet was used.

Comparison of Efficiencies of all Three Methods

Efficiency of current+PM flux was 67% to 100% more than the efficiency of current-only.

Permeable Permanent Magnet

Researcher and inventor: Umer Farooq

The advanced experiments showed that at higher current plus higher permanent magnet flux, the efficiency of a magnetic interaction increased substantially. However, it is not always possible using of higher current level. To get extra efficiency at lower current, I carried out a thorough research.

It was observed that if there is some distance between like-poles of an electromagnet and a strong permanent magnet, they repel each other but if they are very near to each other, they are glued to each other. It was inferred from this observation that:

When there is a reasonable distance between the like poles of electromagnet and a permanent magnet, all 'B' lines of the strong permanent magnet do not reach the like pole of the electromagnet. A reasonable part of the 'B' lines go astray and never reach the like pole of the electromagnet. The like pole of the electromagnet finds the PM 'B' lines weaker and becomes able to push them away.

When both like poles are very near to each other, over quantity of PM 'B' lines penetrate into the unsaturated part of the iron core of the electromagnet. It produces attraction.

Therefore, the basic need was to lessen PM 'B' lines during repulsion to strengthen the repulsion.

It was hypothesized that if a piece of a magnetic material is added to a pole of a permanent magnet, the over quantity of PM flux would hardly reach the like pole of the electromagnet. Presence of non-magnetized parts in a magnet would provide extra permeability that would provide the PM flux a better path to emit during repulsion. 'B' lines do not need to confront like 'B' lines. They try to avoid the confrontation. Due to the extra permeability, a reasonable amount of 'B' lines would find a regular scope to emit instead of confronting the like flux of the electromagnet. The like pole of the electromagnet would easily repel the remaining flux.

All this meant that adding of extra iron or some other magnetic material to the surface of the like pole of PM would strengthen the repulsion. The hypothesis was tested and was found valid. The permeable permanent magnet produced double repulsion force than that was produced by an ordinary permanent magnet; while the attraction forces of both kinds of permanent magnet remained equal to each other.

Permeability—added permanent magnet used lower input power and provided stronger output power in comparison with ordinary permanent magnet.

Hypothesized 'B' Lines of a Permeable Permanent Magnet (To avoid unnecessary effort, some suitable images were taken from internet).

Function of Iron

Usually 'B' lines of a permanent magnet emit from surface, but when a piece of iron is added to a permanent magnet, 'B' lines emit from all sides of the iron piece. Figure: 15

Figure 15:
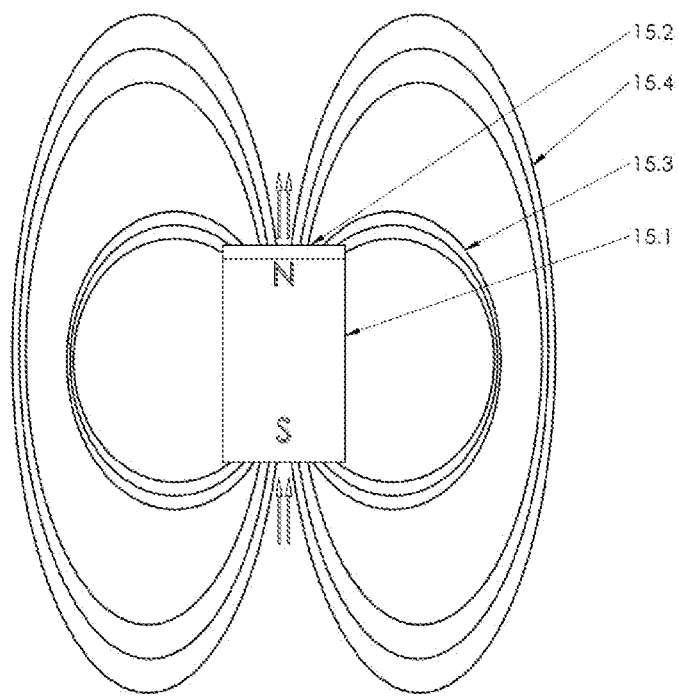
FIG. 15: 13' lines emit from all sides of an iron piece that is added to a permanent magnet

FIG. 15.1: Permanent magnet; FIG. 15.2: Iron piece added to the permanent magnet; FIG. 15.3: Inner set of flux line; FIG. 15.4: Outer set of flux line 'B' Lines of a Permeable Permanent Magnet Pattern of 'B' lines of a permeable permanent magnet is different than that of an ordinary permanent magnet. Some of the 'B' lines emit from sides and some of the 'B' lines emit from surface of iron piece. Therefore, 'B' lines of permeable permanent magnet make two sets. 'B' lines emitting from sides make inner set. 'B' lines emitting from surface make outer set.

Figure: 16

Figure 16:
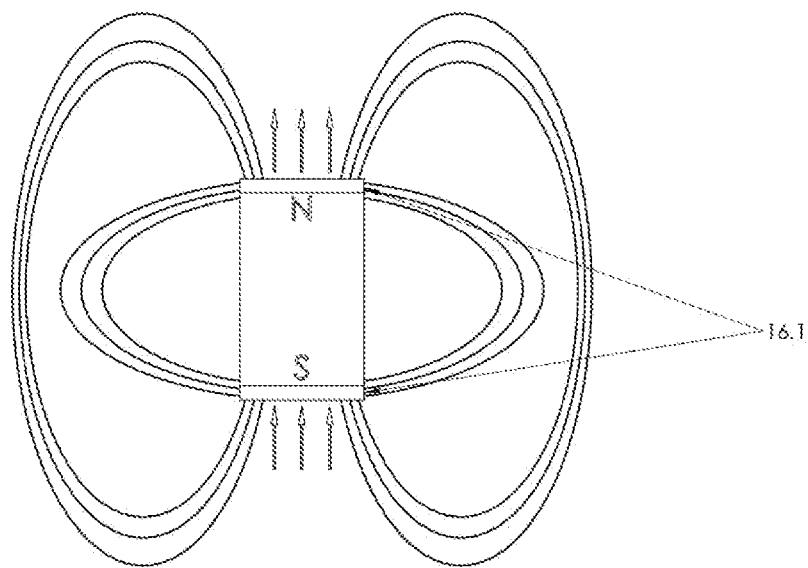
FIG. 16: pattern of 13' lines of a permeable permanent magnet

FIG. 16.1: Iron added to both poles. Rest parts of this figure have been explained in FIG. 15.

Measurement of the 'B' Lines Using a Gauss Meter

A gauss meter can measure only strength of outer set of 'B' lines of a permeable permanent magnet. Inner set of 'B' lines remains hidden and is activated only when the magnet attracts another magnet. That is why a gauss meter cannot read the real strength of a permeable permanent magnet. Figure: 17

Figure 17:
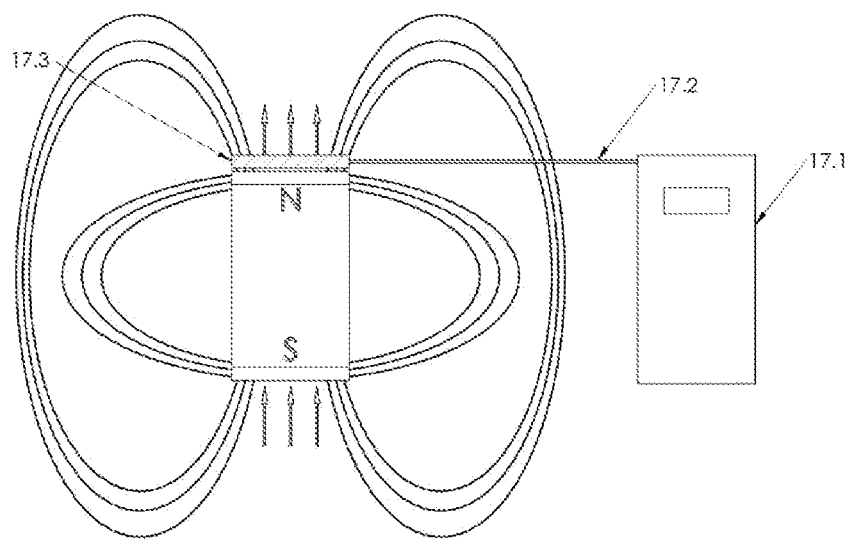
FIG. 17: A gauss meter can measure only strength of outer set of 13' lines

FIG. 17.1: Gauss meter; FIG. 17.2: Lead wire; FIG. 17.3: Sensor

Attraction Between a Permeable Permanent Magnet and Iron

Contrary to an ordinary permanent magnet of same strength, a permeable permanent magnet attracts an iron piece weakly. Inner set of 'B' lines ignores the iron piece and go on making loop with other pole. Only outer set of 'B' lines attracts the iron piece. Figure: 18

Figure 18:
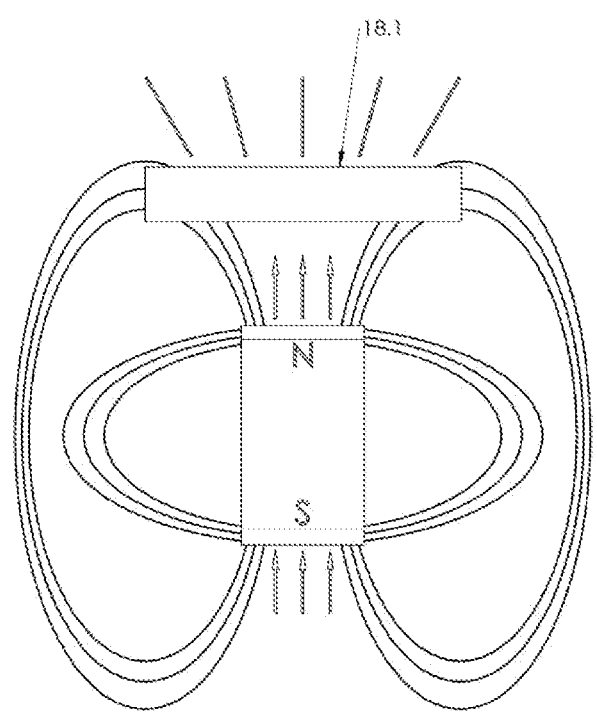
FIG. 18: a permeable permanent magnet attracts an iron piece weakly

FIG. 18.1: Iron piece

Attraction Between a Permeable Permanent Magnet and an Electromagnet Magnet

Attraction force of a permeable permanent magnet remains same as that of an ordinary permanent magnet. Inner set of flux lines ceases to exist due to presence of unlike pole on opposite side. All 'B' lines follow attraction. So, full attraction force of a permeable permanent magnet is got. Figure: 19

Figure 19:
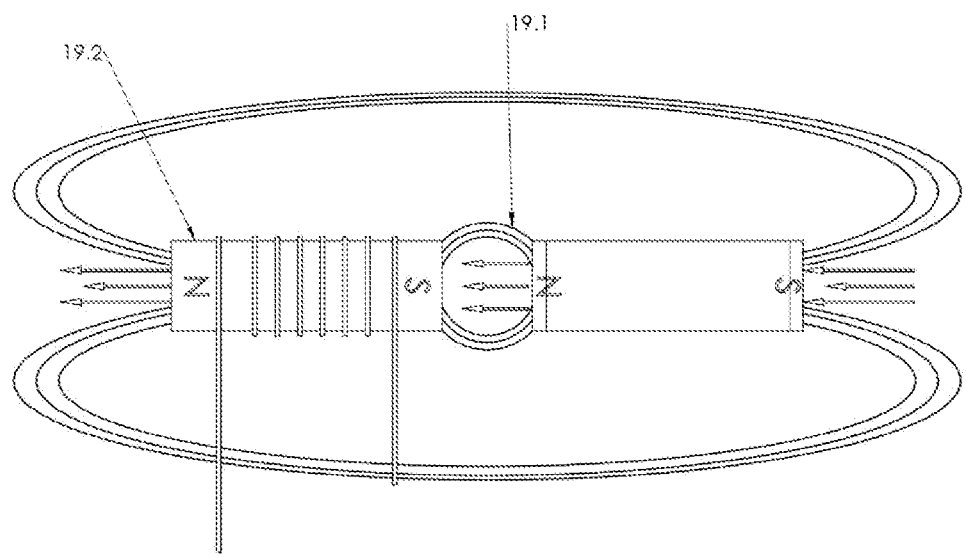
FIG. 19: attraction between a permeable permanent magnet and an electromagnet

FIG. 19.1: full concentration of the flux of the permeability-added permanent magnet during attraction; FIG. 19.2: Electromagnet Repulsion Between an Ordinary Permanent Magnet and an Electromagnet When an ordinary permanent magnet repels a partially-saturated electromagnet, some of its flux repels the flux of the electromagnet; some of PM flux penetrates into iron and attracts it, instead of repelling. This attraction force balances equal part of repulsion force. Repulsion force is damaged ultimately. Figure: 20

Figure 20:
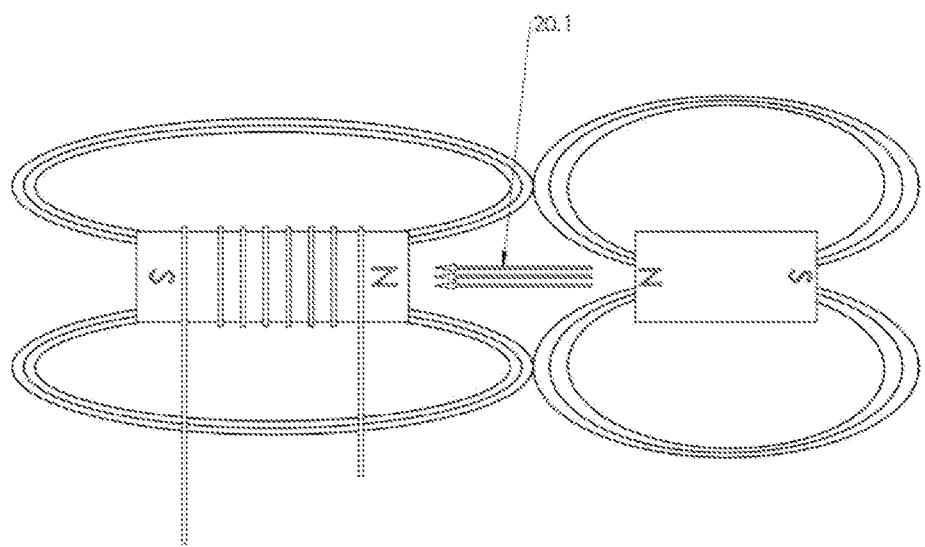
FIG. 20: repulsion between an ordinary permanent magnet and an electromagnet

FIG. 20.1: Heavy 'attraction during repulsion' between an ordinary permanent magnet and an electromagnet Repulsion Between a Permeable Permanent Magnet and an Electromagnet When a permeable permanent magnet repels an electromagnet, some of its flux repels the flux of the electromagnet. Some of its flux emits from sides of iron piece to avoid confrontation to the like flux of the electromagnet. Only a smaller quantity of flux remains available to penetrate into the electromagnet. Weak penetration of PM flux into iron of the electromagnet produces weak attraction only. Weak attraction balances smaller part of repulsion force. Therefore, repulsion force of permeable permanent magnet is always stronger than that of an ordinary permanent magnet. Figure: 21

Figure 21:
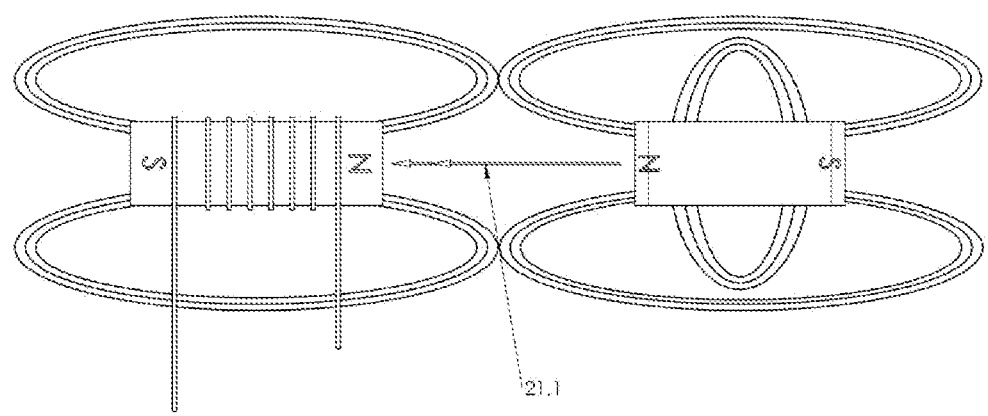
FIG. 21: repulsion between a permeable permanent magnet and an electromagnet
Figure 22:
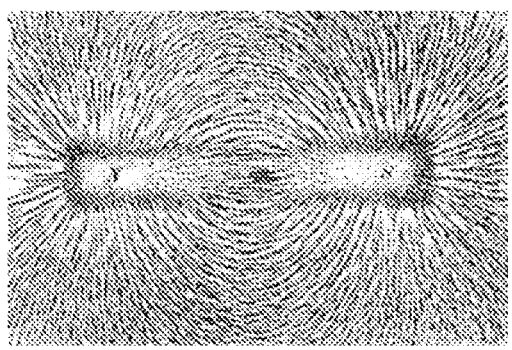
FIG. 22: alternative design of permeable permanent magnet

FIG. 21.1: Weak 'attraction during repulsion' between the permeability-added permanent magnet and an electromagnet Alternative Design of Permeable Permanent Magnet Adding of extra iron or any other material is not must. A partially-saturated magnet can act like a high repulsion/permeable permanent magnet, too. (Picture from Google search), Figure: 22

Experiments 3 experiments were carried out to verify the function of 'B' lines of permeable permanent magnet. Numbers allotted to these experiments are 4, 5 and 6; because these experiments have to be compared with the results of the advanced experiments.

These experiments were carried out using the same methods and the same devices that were used to carry out the advanced experiments. Only saturated permanent magnet was replaced by permeable permanent magnet.

To make a permeable permanent magnet the same permanent magnets were used as were used in the advanced experiment.

To make a permeable magnet for each of these experiments, a non-magnetized piece of magnetic material was added to the permanent magnet/s.

Specification of the piece=ring shape, grade SH33 (material), size: D25 mm*dl2 mm*2 mm.

The SH33 is the same material that was used to make the permanent magnets (used in these experiments).

The same material was used to prove that the addition of only unsaturated permeability was responsible for the extra repulsion of the permeable magnet.

In fact, the addition of iron produced more repulsion force than that was produced by the addition of SH33 material. That is why I always use iron to add unsaturated permeability to a permanent magnet.

The same electromagnet interacted with permeable permanent magnet on the same magnetic power measuring device.

The same input was used for repulsion and attraction of an experiment.

A high repulsion magnet needs stronger built-in PM flux so more PM flux was used in each of these experiments than that was used in previous 3 experiments.

Comparison of results of these three experiments with those of previous experiments clearly proved that the permeable permanent magnet provided very high repulsion force at lower current levels in comparison with that of an ordinary magnet.

Magnetic configuration in experiments number 4, 5 and 6 (Chart), Figure: 23

FIG. 23.1: Electromagnet; FIG. 23.2: Iron piece; FIG. 23.3: Two permanent magnets;

FIG. 23.4: Iron piece; FIG. 23.5: Three permanent magnets; FIG. 23.6: Iron piece; FIG. 23.7: Four permanent magnets Result Table: data of experiment numbers 4, 5 and 6 with the data of experiments 1, 2, 3. Figure: 24

Experiment numbers 4, 5 and 6 used lower input and provided stronger repulsion force in comparison with experiment numbers 1, 2 and 3.

Experiment numbers 4, 5 and 6 used lower input and provided stronger output of a complete cycle of attraction and repulsion The result of experiment number 6 did not prove proper increment in efficiencies. Seemingly, it was because non-magnetic piece of the material is not thick enough to provide enough scope for 'B' lines to emanate from sides properly.

Higher repulsion allowed using of higher flux of permanent magnet. Higher flux provided higher attraction force during a complete cycle of repulsion and attraction.

Higher repulsive and attractive forces produced extra output power at no-cost.

Average of the efficiencies of these 4 to 6 experiments was approximately 53% greater than that of previous experiments numbers 1 to 3.

The gradual increment in efficiency remained intact during experiments 4, 5 and 6. Therefore these experiments verified the result of experiment 1, 2 and 3.

The results of these experiments validated that 'When same sized single poles of the electromagnet and the permanent magnet repelled and attracted other while higher current was applied to the electromagnet and the flux of the pole of the permanent magnet was enhanced, the efficiency of the complete cycle of repulsion and attraction between the poles increased substantially'.

Analysis of the Result

Permeable permanent magnet allowed a reasonable part of its "B" lines to escape from the edges to avoid confrontation to the like pole of the electromagnet.

A smaller part of 'B' lines remained available to confront the like pole of the electromagnet.

Larger part of the remaining surface 'B' lines repelled like flux of electromagnet.

Smaller part of remaining surface 'B' lines of permeable magnet remained available to penetrate into the iron-core thus caused very weak "attraction during repulsion".

Very weak "attraction during repulsion" balanced (wasted) only a little amount of repulsion force.

The size of balanced (wasted) force reduced highly. Resultant force increased reasonably. Efficiency increased greatly.

Disadvantage a) A permeable permanent magnet cannot show its full efficiency when it works in an unlike field-poles configuration. Flow of flux between unlike field-poles compels a reasonable amount of 'B' lines of permeable PM to act in attraction even when repulsion is desired. It damages repulsive force.

b) Nearby situated unlike-permeable-poles attract each other more strongly than ordinary permanent magnets. This stronger attraction wastes a reasonable amount of total PM flux.

Equal Poles DC Motor that Shows Ever-Increasing Efficiency

Researcher and inventor: Umer Farooq

A PMDC motor was built around the discoveries that were made during the experimental research. Basically two major findings from the research were basis of this motor:

1. When interacting electromagnet was provided more current and stronger permanent magnet was used, efficiency of a magnetic cycle increased strongly.
2. When the same input for the same electromagnet was used to interact with each of permeable and saturated permanent magnet, the efficiency of a permeable permanent magnet greatly exceeded the efficiency of a saturated permanent magnet.

Application of the Findings on the Motor

The individual sizes of all PM field-poles and electromagnetic armature poles were the same so that each of the poles could interact with opposite pole independently to align its repulsive and attractive forces with the opposite pole correctly.

Heavy permanent magnets were used as field poles.

A slotted iron stator was used to cover the surfaces of the permanent magnet field-poles for making the permanent magnet field-poles "permeable".

Picture and diagram of the motor, Figure: 25 & 26

Figure 25:
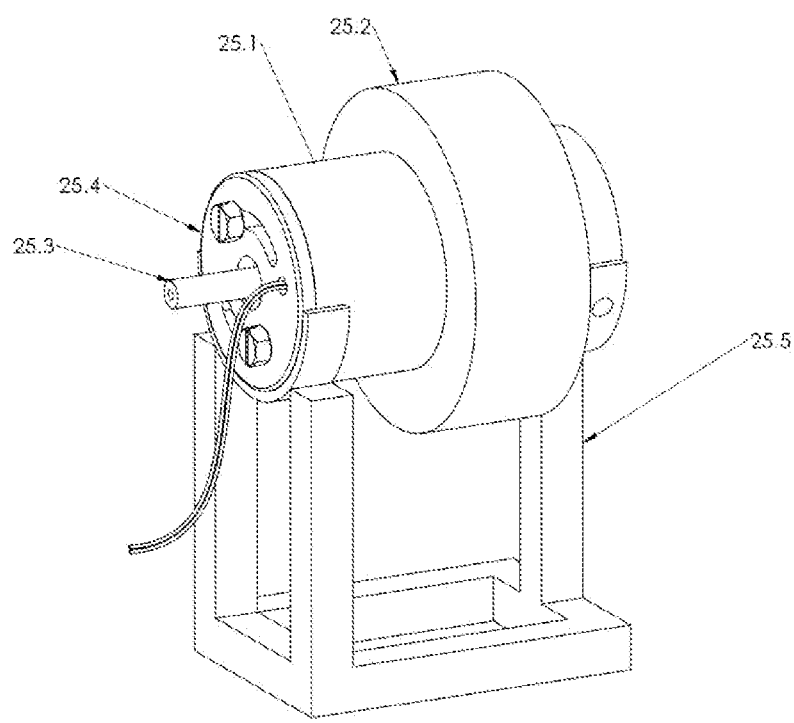
FIGS. 25 & 26: Picture and diagram of the equal-poles motor
Figure 26:
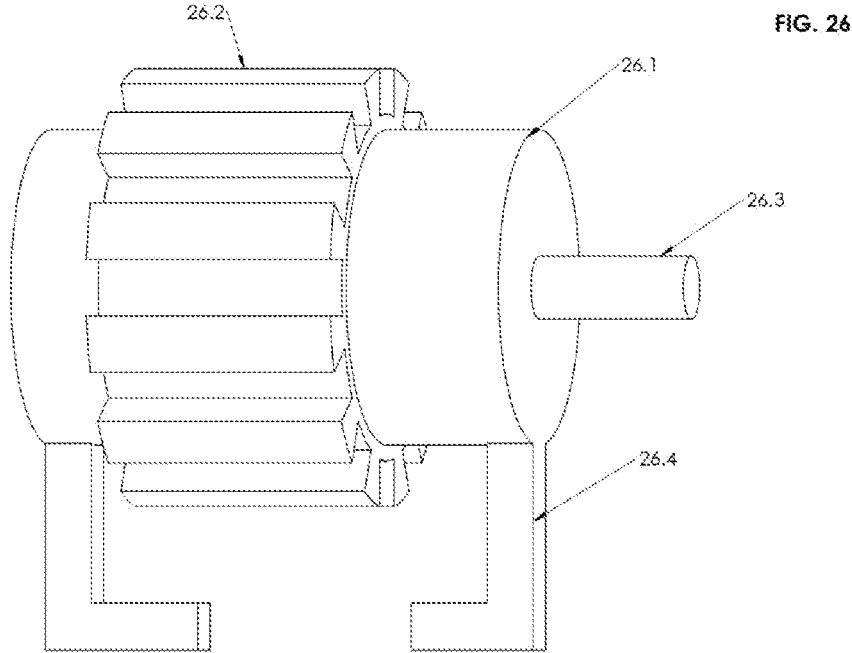

FIG. 25.1: Stator; FIG. 25.2: Field poles; FIG. 25.3: Shaft; FIG. 25.4: Brush adjusting part; FIG. 25.5: Stand FIG. 26.1: Stator made of brass; FIG. 26.2: 12 field poles fixed on 12 iron teeth fixed in the stator; FIG. 26.3: Shaft made of brass; FIG. 26.4: Stand made of iron How the Equal Pole Motor was Built Material Armature with Shaft and Commutator A readymade armature of a small D.C motor was got.

Specification: diameter 1 9/16 inch. Length: 1 3/8. Number of slots=12. Weight of iron without shaft: 153 gram. Made of thin insulated iron sheets.

A shaft, made of brass was inserted in the armature. Size of shaft: diameter=3/8 inch. Length: 6 inch.

A small commutator of 12 segments was installed on the shaft.

This armature was winded/wired in such a way that when current is given, polarities of all slots were to be opposite to one another. (Example: S-N-S-N-S-N and so on).

Winding: wire number 35; turns of wire on each of 12 teeth=250

As direction of current was changed, polarities of all slots were changed accordingly.

Iron Stator with Nonmagnetic Holding Plates

A rounded piece of soft iron was provided. Size: diameter=2 3/5 inch. Length=1 3/8 inch.

A hole was made into the iron piece to convert the piece into a pipe or cylinder, diameter of the hole=1 5/8.

This cylinder was covered by brass plates on both sides.

One of the plates had a hole of the same size as the cylinder had. This plate Made mouth of the cylinder.

Other plate had only a small half-hole to hold a bearing. This plate made end of the cylinder.

The iron cylinder was divided into 12 long cuts. Gap between two such pieces was the same as the gap between two armature slots. Size of each gap=3/32 inch.

The cylinder was machined to remove over quantity of iron. Weight of remained iron=430 grams.

Covering plate: this third plate was removable. It was fitted on the mouth of the cylinder. There was a hole in this plate for bearing. It held the armature into the cylinder when the motor was assembled. Carbon brushes were installed inside this plate.

Permanent Magnets

These permanent magnets were to be installed on the outer teeth of the iron stator.

Total 12 permanent magnets were used for 12 teeth of iron cylinder.

Specification of Each of 12 Permanent Magnets

Material: SH 33; Size=width: 8 mm*depth 16 mm*length 34 mm magnetized through 16 mm; cross sectional area of each PM pole=8 mm*34 mm Stands Assembling Armature was inserted into the iron stator.

The covering plate with carbon brushes and bearing was fixed on the mouth of the stator.

Individual saturated permanent magnets were installed on the outer teeth of the iron stator. Each of permanent magnet was installed in such a manner that one tooth of the iron stator became S-pole and the next tooth became N-pole (Example: S-N-S-N-S-N and so on).

Stands were also installed properly.

Result

When both current and PM flux were enhanced in this motor, efficiency increased accordingly, continuously and substantially. Recovery of the ever-increasing efficiency made this motor most important. Ever increasing efficiency meant that an unknown part of the efficiency still remained hidden. Improved models can recover the rest efficiency. Where this ever increasing efficiency is coming from?

Three-Fold Magnetic Circuit

Researcher and inventor: Umer Farooq

The results got from advanced experiments proved that 'the efficiency of current+PM flux was 67% to 100% more than the efficiency of current-only. It was apparent that the permanent magnet created the additional efficiency. However, this matter was very important so the result had to be verified using a different method. To fulfill this purpose a three-fold-magnetic circuit was developed.

The hypothesized action of flux lines in a three-fold magnetic circuit, Figure: 27

Figure 27:
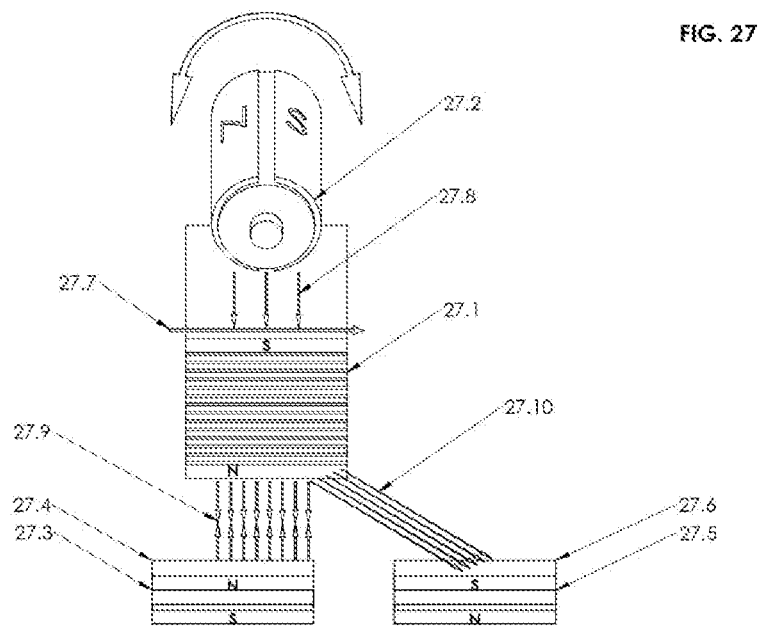
FIG. 27: the hypothesized action of flux lines in a three-fold magnetic circuit

FIG. 27.1: Electromagnet; FIG. 27.2: Rotating permanent magnet; FIG. 27.3: First Permanent magnet field pole; FIG. 27.4: Iron piece; FIG. 27.5: $2^{nd}$ permanent magnet field pole; FIG. 27.6: Iron piece; FIG. 27.7: Direction of movement of the electromagnet; FIG. 27.8: The flow of flux between the electromagnet and rotating permanent magnet; FIG. 27.9: Repulsion between electromagnet and first field pole; FIG. 27.10: Attraction between the electromagnet and $2^{nd}$ field pole Application of the Three-Fold Magnetic Configuration This circuit was implanted in a rotary actuator. This actuator could work using either an ordinary magnetic configuration or the three-fold magnetic configuration.

Ordinary Magnetic Configuration

A pair of unlike PM field-poles and an electromagnet constituted this magnetic configuration.

The electromagnet was to move over two permanent magnet field poles.

Three-Fold Magnetic Configuration

A rotating permanent magnet was installed on the moving electromagnet.

When polarity of the electromagnet was changed, the rotating permanent magnet rotated automatically.

This rotating permanent magnet was removable and re-installable.

Picture of the actuator when it worked using ordinary magnetic configuration, Figure: 28

Figure 28:
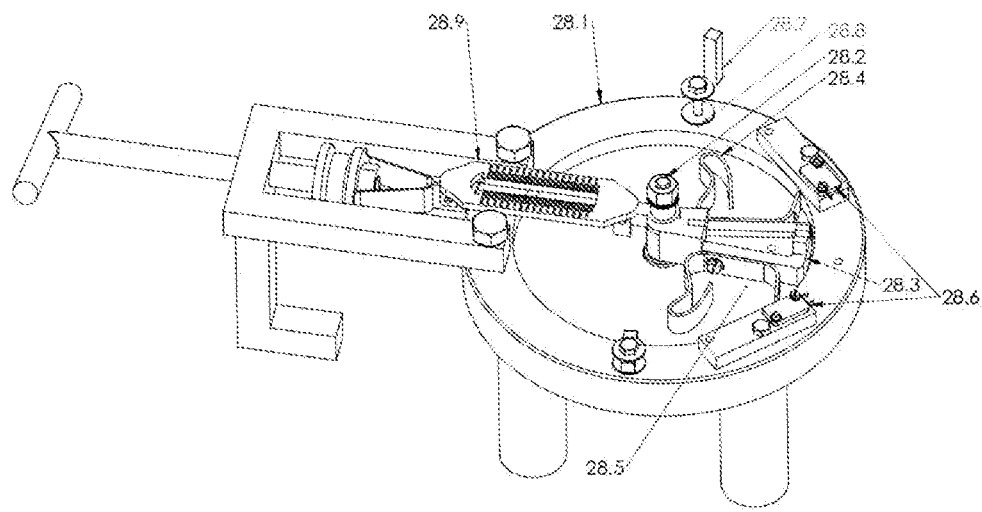
FIG. 28: picture of the actuator when it worked using ordinary magnetic configuration

FIG. 28.1: Body; FIG. 28.2: Shaft; FIG. 28.3: Electromagnet on rotating nob; FIG. 28.4: Limit Springs; FIG. 28.5: Permanent magnet field poles under the moving electromagnet;

FIG. 28.6: Limit switches; FIG. 28.7,28.8,28.9: Efficiency measuring system

Picture of the actuator when it worked using the three-fold magnetic configuration, Figure: 29

Figure 29:
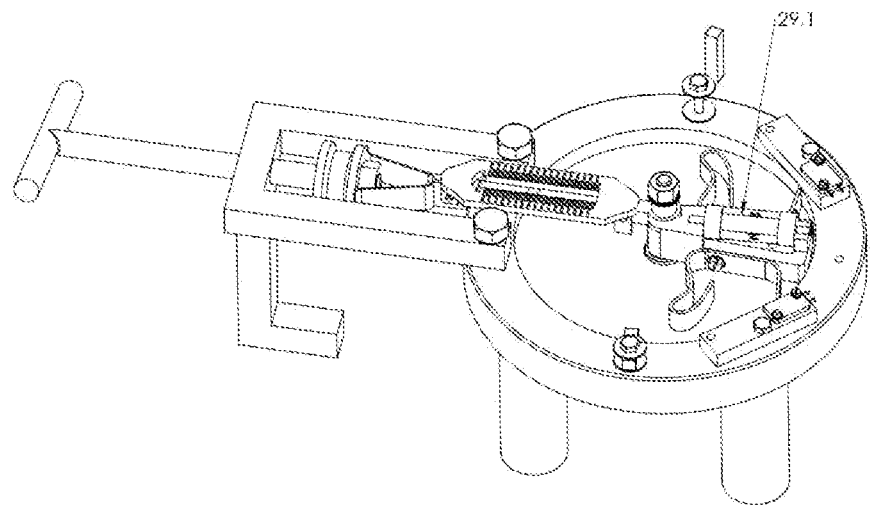
FIG. 29: when the actuator worked using the three-fold magnetic configuration

FIG. 29.1: Rotating permanent magnet installed on the electromagnet

Diagram of the actuator when it worked using the three-fold magnetic configuration, Figure: 30

Figure 30:
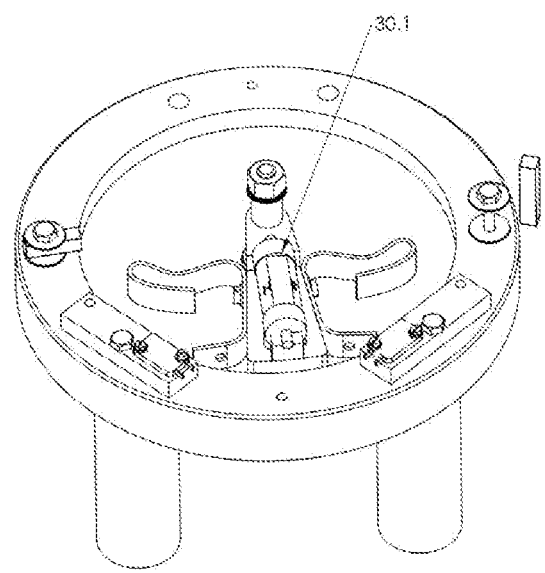
FIG. 30: diagram of the actuator when it worked using the three-fold magnetic configuration

FIG. 30.1: $2^{nd}$ view of the rotating permanent magnet

Specifications

Basic body: Basic device was made of aluminum. A rotating shaft was fixed into two bearings that were fixed in the center of the main frame.

Field poles: two unlike permanent magnet poles were fixed side by side in an aluminum plate. The plate was fixed on the surface of the main frame under the electromagnet. Figure: 31

Figure 31:
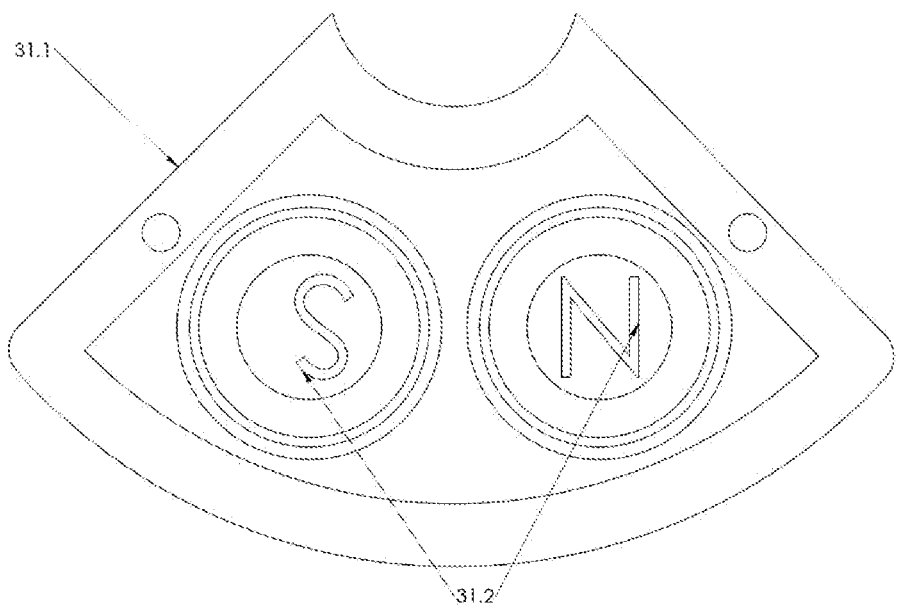
FIG. 31: unlike field-poles fixed side by side in an aluminum plate
Figure 32:
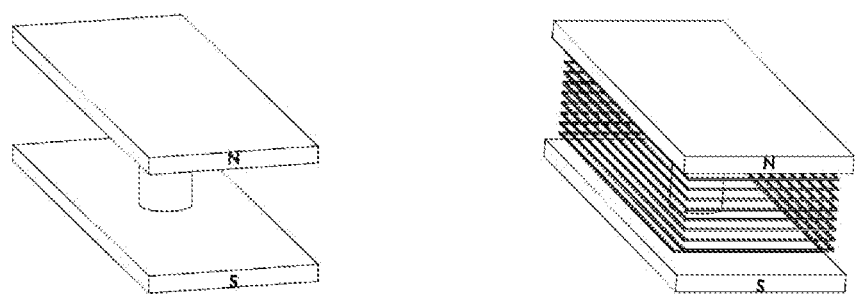
FIGS. 32 & 33: the shape of the electromagnet

FIG. 31.1: Field poles plate; FIG. 31.2: Permanent magnets field poles

Specifications of Each of the Permanent Magnets (Field Poles)

Material: SH33; shape: disc; size: diameter 25 mm, depth 4 mm, magnetized through 4 mm. Pieces of soft iron were added to both permanent magnets to make the permanent magnets 'permeable'.

Specification of Each of the Iron Pieces

Material: soft iron; shape: disc; diameter: 25 mm; depth: 2 mm.

Movable Electromagnet

An electromagnet was fixed in an aluminum knob. This knob was installed on the moveable shaft. A rotatable permanent magnet could be installed on the electromagnet.

Specifications of the Electromagnet

Figure 33:
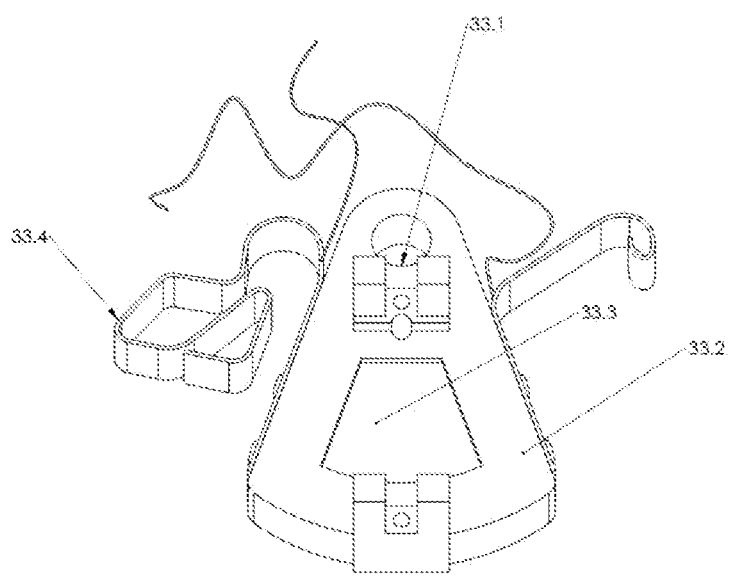

Material: soft iron, Turns of wire: 650, Weight of iron: 43 grams Shape: Figure: 32& 33 FIG. 33.1: shaft hole; FIG. 33.2: Rotating nob; FIG. 33.3: Electromagnet; FIG. 33.4: Limit spring Specification of Rotating Permanent Magnet A bar permanent magnet; material: Grade SH33; size: 34 mm*8 mm*8 mm; magnetized through 8 mm. Each pole covered by a separate piece of iron. Thickness of the iron pieces: 2 mm. Figure: 34

Figure 34:
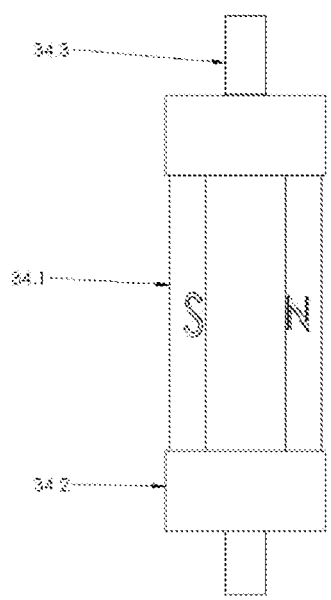
FIG. 34: the rotating permanent magnet

FIG. 34.1: Permanent magnet; FIG. 34.2, 34.3: Installing parts

Result

1. When the rotating permanent magnet was not installed on the electromagnet, a particular amount of efficiency was acquired using a particular amount of input electricity.
2. When the rotating permanent magnet was installed on the electromagnet, efficiency of the actuator jumped 50% higher using the same amount of input electricity. (Difference of the efficiencies was measured using the same criterion).

Conclusions

1. This result was in consistence of the findings from table 4 and from the function of permeable magnet.
2. The extra efficiency of this actuator proved that the magnetic fields of electromagnet and permanent magnet can be combined appropriately even in a three-fold magnetic configuration. The proper combination will produce extra efficiency.

Like-Field-Poles Actuator

Researcher: Umer Farooq

I inferred from the conclusion of the basic research (the detection of a third pole during repulsion) that if the flow of 'B' lines between unlike field-poles is discontinued, there will be no opposite polarity so there will be no braking effect. In absence of the flow of the flux, each of the permanent magnets would act with the armature individually, separately and independently. The elimination of the braking effect would strengthen the output of the motor without using more electric power.

Though the elimination of the opposite polarity would also reduce matching attractive force but this damage can easily be covered by using stronger permanent magnets. Independent like-poles of stronger magnets will interact with the armature forcefully without creating dipolar flow of flux. Consequently, heavy attraction would be got without producing braking effect.

Keeping the above discussion in mind, it was hypothesized that if like-poles are used as field poles in an electrical machine, then the machine will exhibit extra efficiency. Figure: 35

Figure 35:
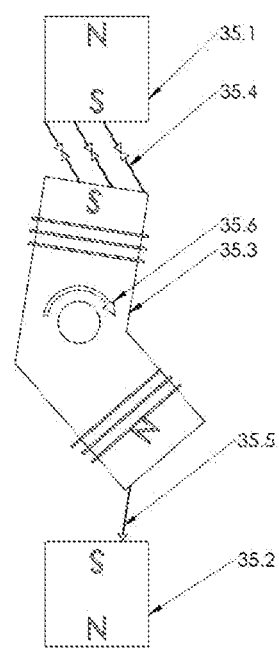
FIG. 35: the use of like-poles as field-poles

FIG. 35.1, 35.2: Permanent magnet field poles; FIG. 35.3: Electromagnet; FIG. 35.4: Repulsion between the like poles of the permanent magnet and electromagnet; FIG. 35.5: Attraction between unlike poles of the permanent magnet and electromagnet; FIG. 35.6: The direction of the rotation of electromagnet A rotary actuator was built to check the hypothesis.

Picture of the actuator, Figure: 36

Figure 36:
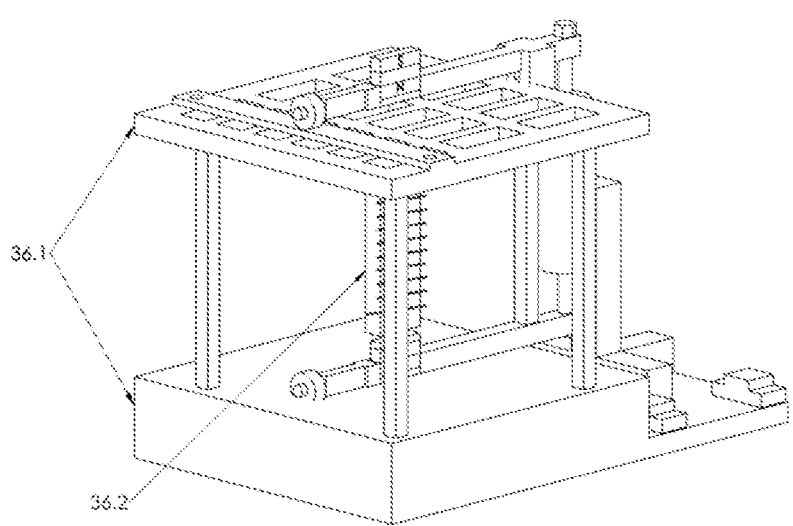
FIG. 36: picture of the like-field-poles actuator

FIG. 36.1: Stator; FIG. 36.2: Electromagnet inside the stator

Diagram of the actuator, Figure: 37

Figure 37:
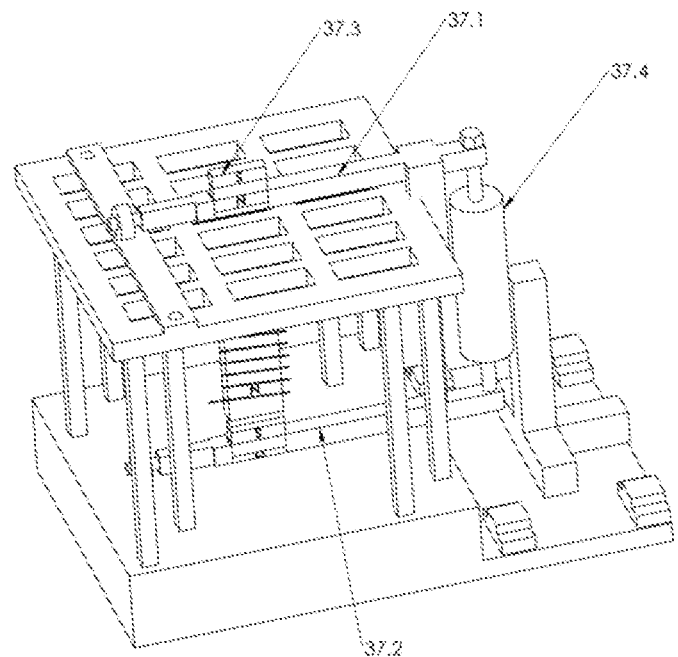
FIG. 37: diagram of the like-field-poles actuator

FIG. 37.1: Upper arm of the rotor; FIG. 37.2: Lower arm of the rotor; FIG. 37.3: Field poles installed on both routers; FIG. 37.4: Rotating shaft Full sketch of the rotor, Figure: 38

Figure 38:
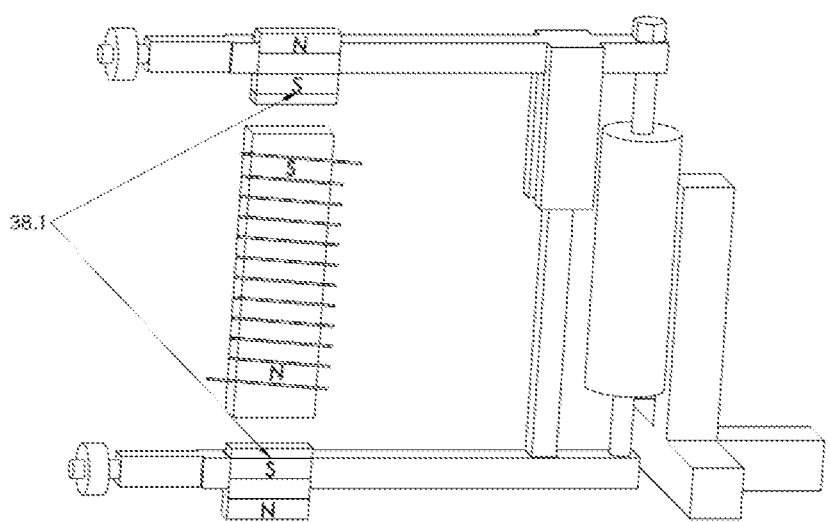
FIG. 38: full sketch of the rotor of the like-field-poles actuator

FIG. 38.1: Like Poles of permanent magnet to act as filed poles

Function of the Actuator

When stator was applied current, one pole of the rotor moved towards unlike pole of the stator because of attraction; and other pole of rotor moved away from other pole of stator because of repulsion.

Figure 39:
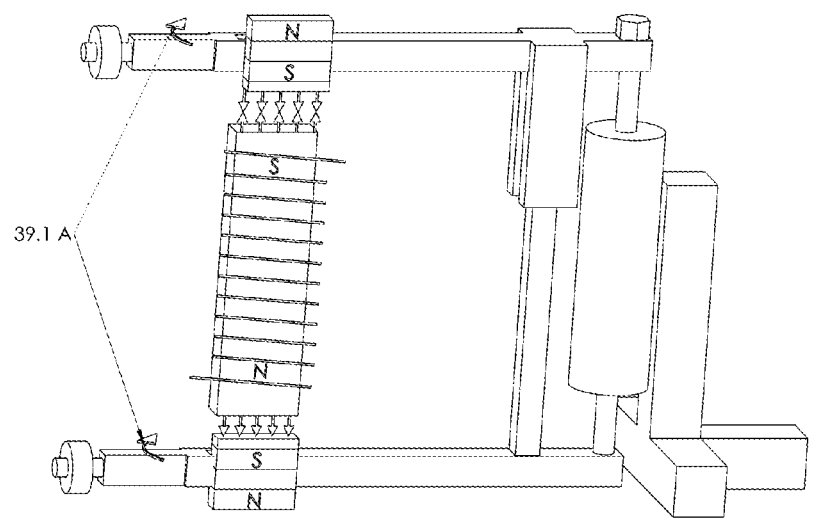
FIGS. 39A & 39B: the movement of the rotor of the like-field-poles actuator
Figure 39:
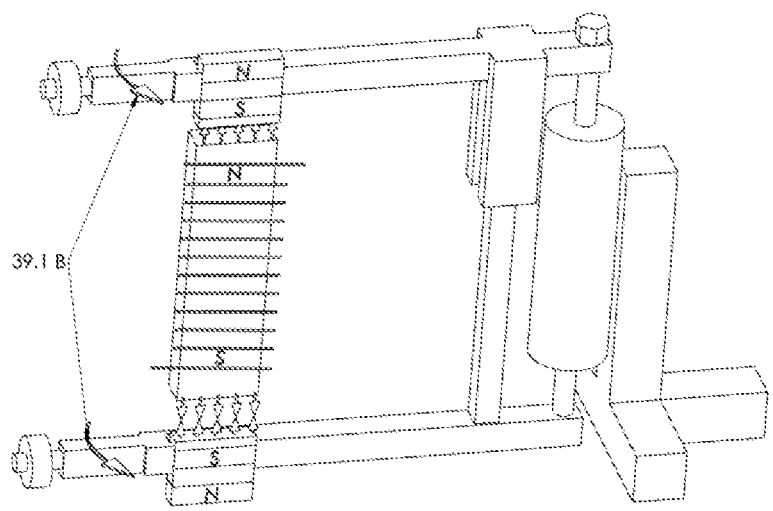

When attracting PM and electromagnetic poles came face to face, direction of current was changed by an electronic circuit. Attracting poles became repelling poles and repelling poles became attracting poles. The rotor moved back. Figure: 39A & 39B FIG. 39.1A: Direction of rotation from right to left FIG. 39.1B: Direction of rotation from left to right Material and Method 1. Body of this machine was made of brass and aluminum.
2. This machine comprised on two main components: stator and rotor
3. This actuator worked on two permanent magnet field-poles and an electromagnet.
4. This actuator used two like poles of permanent magnet as field poles.
5. This actuator used direct current only.
6. Both of the arms were fixed on ends of shaft at different angles. Both arms were installed on the shaft in such manner that when one of the arms would come face to face of an electromagnetic pole, the other arm would be ousted from other electromagnetic pole of the stator.

Specification of the Electromagnet (Fitted in the Stator)
1. Iron core: material=soft iron; shape=bar; size=189 mm*34 mm*8 mm
2. Coil: wire number=30; total weight of wire=4.160 kilogram; turns of wire=17600; resistance of coil=752

Specification of the Rotor

The rotor comprised two arms, one moving shaft and two field poles. The arms were made of brass, so were too heavy. The rotor rotated using 4 bearings. Two bearings were fixed in the pipe around the shaft and two bearings were fixed on the moving ends of the both arms so that the field-poles could not cling to the electromagnet. Weight of the rotor was 1600 gram.

Specification of Permanent Magnet

As single permanent magnets of desired strengths were not available, a set of permanent magnets was installed on each arm to act as a single field pole. Polarity of all the permanent magnets in a set was s-n-s-n; so that all strengths of all permanent magnets should combine.

A set of 6 permanent magnets and an iron bar was installed on each arm. At first iron bar was installed into the square hole then all the 6 permanent magnets were installed on the iron bar. Each set comprised 4 thicker and two thinner permanent magnets. Polarities of all the 6 PMs were in attraction (s-n-s-n). Figure: 40

Figure 40:
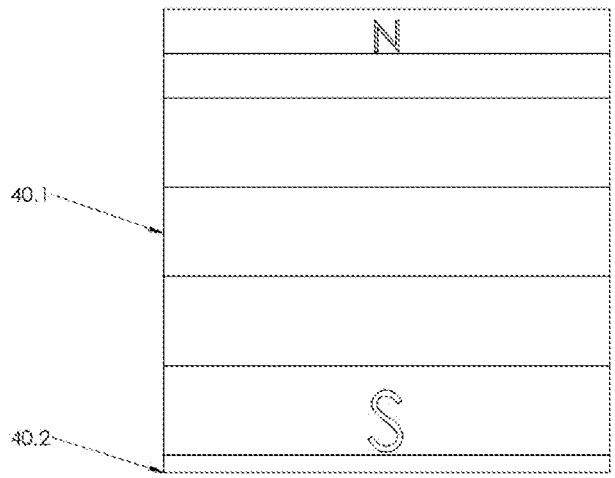
FIG. 40: a set of 6 permanent magnets and an iron bar

FIG. 40.1: Permanent magnets combining into one field pole; FIG. 40.2: iron piece Specification of Each of 4 Thicker Permanent Magnets Material: SH 33; size=8 mm*8 mm*34 mm Specification of Each of Both Thinner Permanent Magnets Material: SH 33; size=3 mm*8 mm*34 mm Specification of Iron Bar Material: soft iron; size: depth=6 mm*width=8 mm*length=34 mm Experiments
1. The actuator (with like-pole field poles) was applied 0.60 watts input power. The actuator worked properly. The efficiency was measured.
2. Both arms (comprising the field poles) were set to face the electromagnet simultaneously, and unlike PM field-poles were installed instead of like-field poles. When the same input power was applied to the electromagnet, the rotor did not move.

Result
1. This actuator proved to be a torque actuator. Torque of this actuator was very high and speed of this actuator was very low.
2. The weight of rotor was (1600 grams) and it used 4 bearings to rotate. Too heavy rotor and friction loss of 4 bearings must have wasted a lot of output power. Besides the heavy losses, the net efficiency of this actuator did not seem less than 80% using only 0.60 watt input power.
3. This actuator enabled double usage of flux lines of a PM like field pole when it attracted an electromagnetic pole. Its flux lines joined the flux lines of the attracted electromagnetic pole and emitted from repelling electromagnetic pole. This action of PM 'B' lines strengthened the repulsion between the repelling field-pole and the electromagnetic pole.
4. Independent-field-poles magnetic configuration allowed using heavy PM flux because no flow of flux occurred between the heavy like-poles (The flow of flux between unlike field-poles brakes the rotation of the armature).

Conclusion

1. Present and potential efficiency of this actuator is an irrefutable proof of validation of independent (like) field pole configuration.
2. Independent-field-poles magnetic configuration allowed permeable PM field-poles to act properly during repulsion (A permeable permanent magnet cannot show its full efficiency when it works in an unlike field-poles configuration. Flow of flux between unlike field-poles compels a reasonable amount of 'B' lines of permeable PM to act in attraction even when repulsion is desired. It damages repulsive force).

Conceived Actions of "B" Lines in the Actuator, Figure: 41

Figure 41:
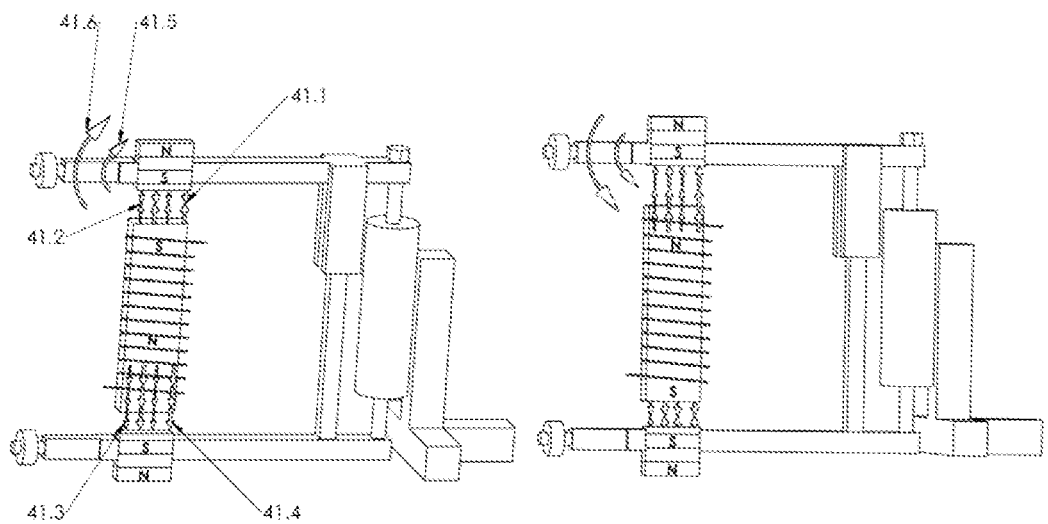
FIG. 41: conceived actions of "B" lines in the like-field-poles actuator

FIG. 41.1: Repulsion caused by both interacting poles; FIG. 41.2: Repulsion caused by the flux of the attracting permanent magnet pole, which travel through the iron core of the electromagnet; FIG. 41.3: Attraction of the electromagnet; FIG. 41.4: Attraction of the permanent magnet; FIG. 41.5: The part of the electromagnet in creation of mechanical output;

FIG. 41.6: The part of the permanent magnet in creation of mechanical output

DETAILED DESCRIPTION OF THE INVENTION

'Revived Repulsion (RR) Magnetic Configuration'
1. Introduction
2. Applicable experimental findings extracted from basic research
3. Conceived design of the revived repulsion magnetic configuration for rotary motors
4. Testing of the practicability of RR magnetic Configuration
5. Testing of the configuration through an experimental device
6. Testing of the configuration through an fully-functional rotary motor
7. Validation of extra efficiency of RR Magnetic Configuration by the function of the motor
8. Disadvantage of RR Magnetic Configuration
9. Maximum potential efficiency of the RR Magnetic Configuration
10. Alternative designs of the configuration and motor Introduction of the Invention This is a disruptive extra efficient magnetic configuration.
This magnetic configuration has been developed to be used to build new generation extra efficient permanent magnet motors.
This magnetic configuration revitalizes repulsive force in a PM motor without using additional current. Resultantly, the output power of the PM motor is highly strengthened at no-cost.
This magnetic configuration has been extracted from a series of new scientific findings.
The scientific findings have emerged from novel results of new experiments and from the novel functions of newly invented devices and fully functional electrical machines.
Applicability and workability of the whole magnetic configuration has been checked and validated by building a fully functional small rotary motor that works on the whole magnetic configuration.
Present and immediately recoverable efficiency of this motor is at least double than the highest efficiency of present small motors of the same power range.

Applicable (to this Invention) Experimental Findings and Conclusions Extracted from Basic Research, which Resulted in Extra Efficiency Extracted from: Basic Research: The Detection of a Third Pole During Repulsion Between an Electromagnet and a Permanent Magnet 1. Opposing PM attraction (produced due to unsaturated part of a repelling armature) has to be minimized.
2. Opposing PM attraction produced due to dipolar field-poles configuration has to be eliminated.

Extracted from: Advanced Experiments

3. Only a single PM-pole should interact with electromagnet to avoid messing of 'B' lines
4. In a magnetic configuration, minimum number of interacting magnetic poles should be used to avoid any balance (wastage) of magnetic forces.
5. Interacting magnetic poles should be same sized to avoid any messing of 'B' lines.
6. Degree of magnetization of the iron teeth of the armature should remain higher. It is necessary for minimizing of opposing force that is caused by the penetration of PM flux in unsaturated parts of repelling iron teeth.
7. Removing of unnecessary permeability from the iron teeth is necessary to maintain higher degree of magnetization of the teeth.
8. No unenergized poles (no-current iron teeth in the electromagnetic part) should be expelled from a permanent magnet pole. The expulsion would produce heavy opposing attraction.
9. The use of maximum PM flux is necessary because higher PM flux produces extra efficiency along with higher degree of magnetization of the armature teeth.
10. The use of dipolar electromagnetic teeth is necessary to get full output power of an electromagnet in a magnetic interaction.

Extracted from: Permeable Permanent Magnet

11. The use of additional, unsaturated permeability in appropriate amount is necessary either mounted on the surface of a permanent magnet pole or scattered/distributed into the entire permanent magnet. The usage would produce extra repulsion.
12. The use of maximum PM flux is necessary because heavy PM flux would strengthen both attractive and repulsive forces of a permeable permanent magnet against an electromagnet (attraction of an ordinary permanent magnet is also strengthened when a stronger PM is used but it damages repulsive force against an electromagnet when lower current is used).
13. Dipolar PM-field-poles should not be used. It damages the extra repulsion force produced by a permeable permanent magnet.

Extracted from: Like-Field-Poles Actuator

14. The field-poles must comprise only like PM poles.
15. Dipolar field-poles produce heavy attraction but this attraction is wasted during expulsion of unenergized teeth from PM field-pole. Attraction force of the same PM field-poles reduces to half when the field-poles are used in like pole magnetic configuration. Use of heavy PMs would revitalize the attractive force in like pole magnetic configuration. This attractive force is very useful).

16. The use of two-fold action of flux lines of a PM field-pole is necessary. The use of heavy PM field-poles would strengthen the two-fold action of 'B' lines of the same field poles.

Design of RR Magnetic Configuration for Rotary Motors

On the basis of "applicable experimental findings and conclusions extracted from the back ground research", a complete magnetic configuration of new kind has been designed.

An independent single PM field-pole and two energized electromagnetic teeth make basic working unite in this configuration.

Any number of independent field poles can be used to build a motor. Any field pole configuration that comprises more than one field pole must comprise only like-field poles.

In a multi-like-field-poles configuration, at least one tooth between two energized pairs of electromagnetic poles should always remain unenergized and out of the active range of any field pole so that none pair of the field-poles could attract or repel an electromagnetic pole simultaneously.

MR. Emmanouil Markoulakis (a very brilliant scientist on Researchgate.net) has expressed apprehensions about the negative effects of installing many like poles in a motor.

The creation of forces by main and leaked flux eliminates the apprehension. A 4-field-pole-configuration is described.

Diagram of a Four-Field Pole RR Magnetic Configuration, Figure: 42

Figure 42:
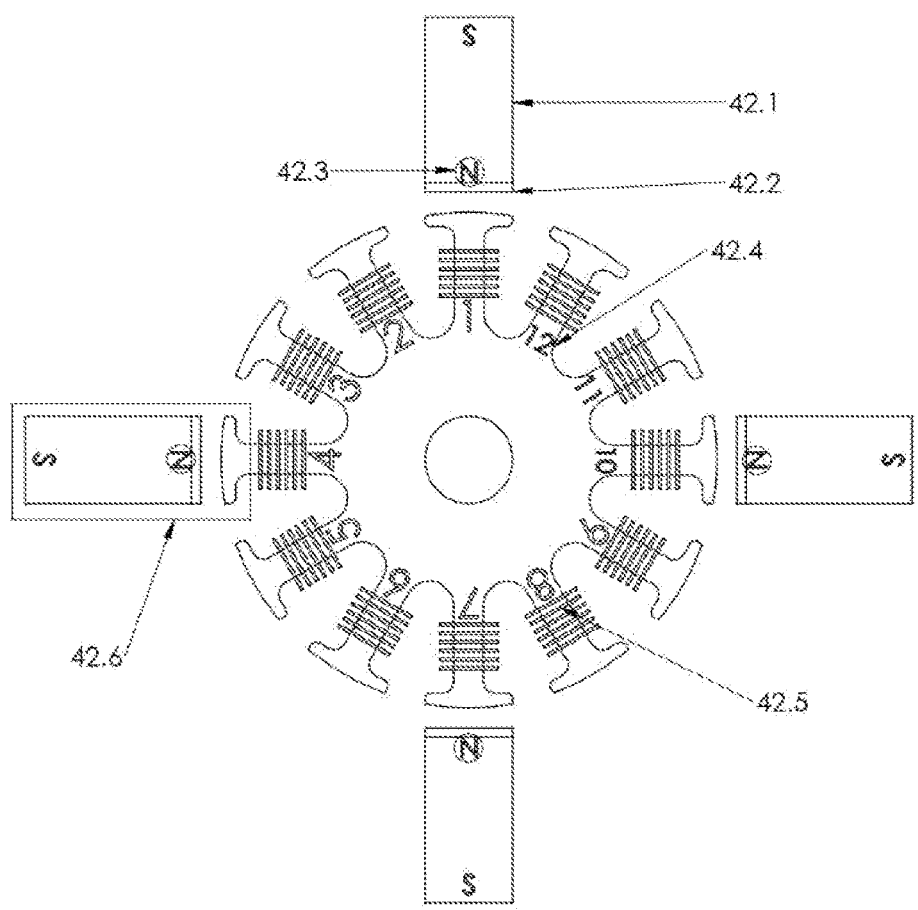
FIG. 42: the diagram of four-field-poles RR Magnetic Configuration

FIG. 42.1: Permanent magnet; FIG. 42.2: Iron pieces added to every one of the 4 permanent magnet field poles; FIG. 42.3: All four field poles are like poles; FIG. 42.4: The armature has 12 teeth; FIG. 42.5: Everyone tooth of the armature contains concentrated coil; FIG. 42.6: Sizes of cross-sectional areas of all field poles and all the teeth of armature are the same and equal to each other When Current is Applied:
1. 8 teeth out of 12 teeth of armature are energized in such way that every third tooth remains unenergized.
2. One of the energized teeth and pole of the permanent magnet attract each other; and the other energized tooth and the same permanent magnet pole repel each other. Figure: 43

Figure 43:
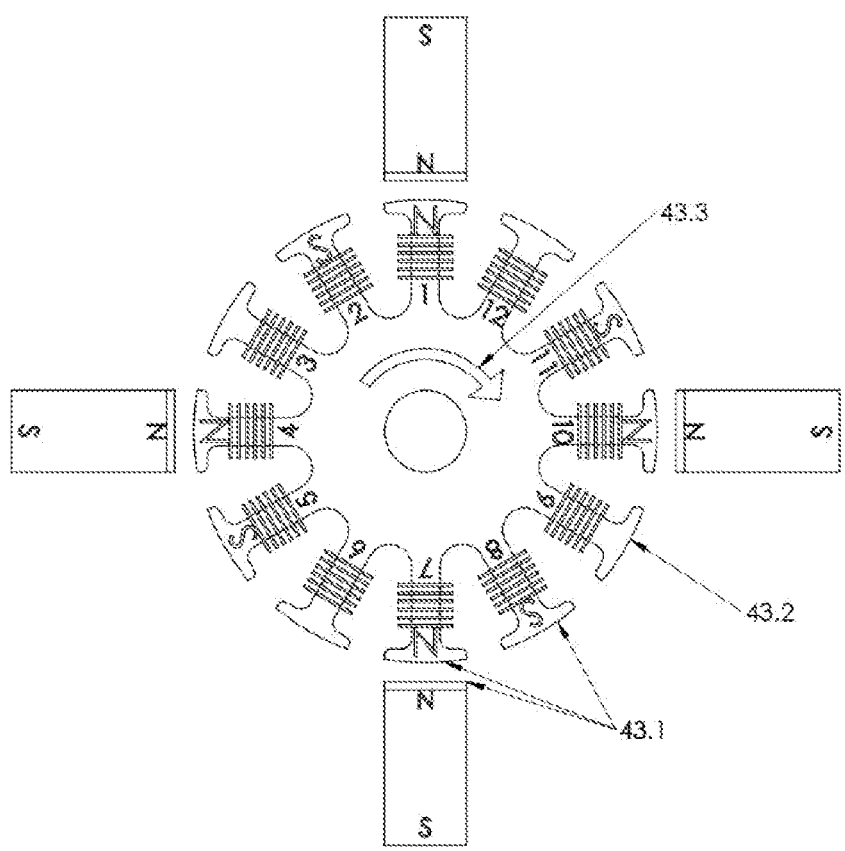
FIG. 43: when current is applied, two teeth are energized unlikely

FIG. 43.1: One of the field poles, one of the repelling teeth of the armature and one of the attracting teeth of the armature jointly make a working unit; FIG. 43.2: Every third teeth, situating after a pair of energized teeth, remains un-energized; FIG. 43.3: The direction of rotation 3. Repelling teeth are expelled from the permanent magnet.
4. Attracting teeth come face to face with the permanent magnet.
5. As soon as the attracting tooth of the armature comes exactly face to face with the permanent magnet, the commutation system puts the current off and then applies the current in such way that the repulsive teeth (now expelled from the permanent magnet) becomes un-energized, the attracting tooth becomes repulsive and coming teeth becomes attractive.

Creation of Force in Four Field-Poles RR Magnetic Configuration

Each of 4 PM field-poles creates a combination of magnetic force independently. Four independent combination of magnetic force are created in this configuration.

The flux creates a proper combination of heavy matching forces in each of the working unite comprising one PM and two energized teeth of the armature:

1. Heavy attraction force is produced between heavy PM-field-poles and attracting teeth
2. Heavy repulsion is produced due to:
    a) Normal repulsion that is always produced between the like poles of a PM and an electromagnet
    b) Repulsion caused by extra permeability added to the permanent magnet
    c) Repulsion caused by two-fold action of 'B' lines of like PM field-poles Figure: 44

Figure 44:
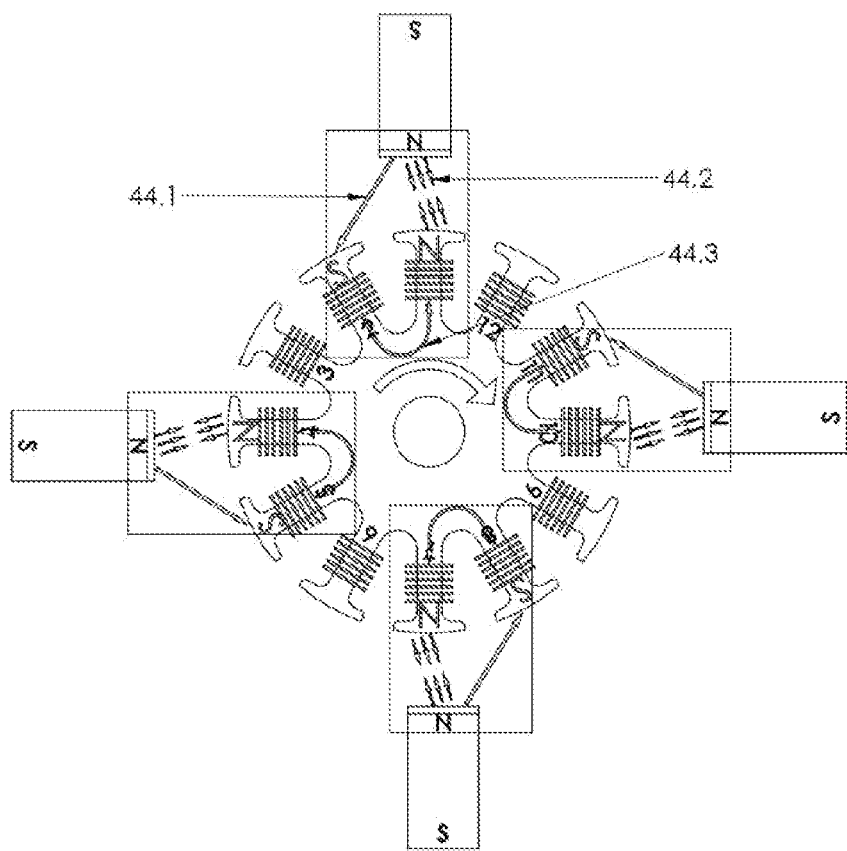
FIG. 44: creation of force in four-field-poles RR Magnetic Configuration
Figure 45:
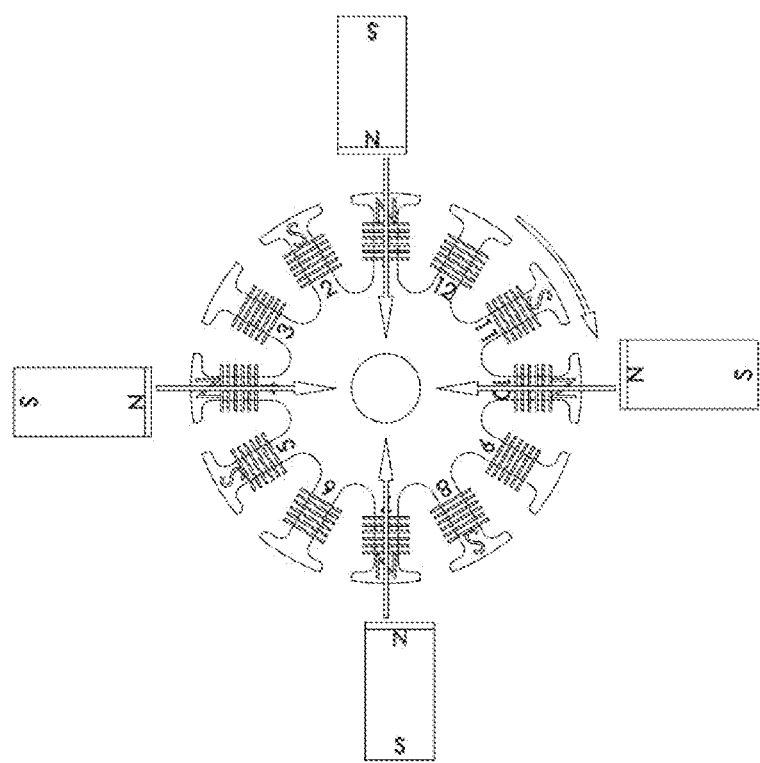
FIG. 45: the leakage of flux due to unsaturated part of repelling teeth of armature
Figure 46:
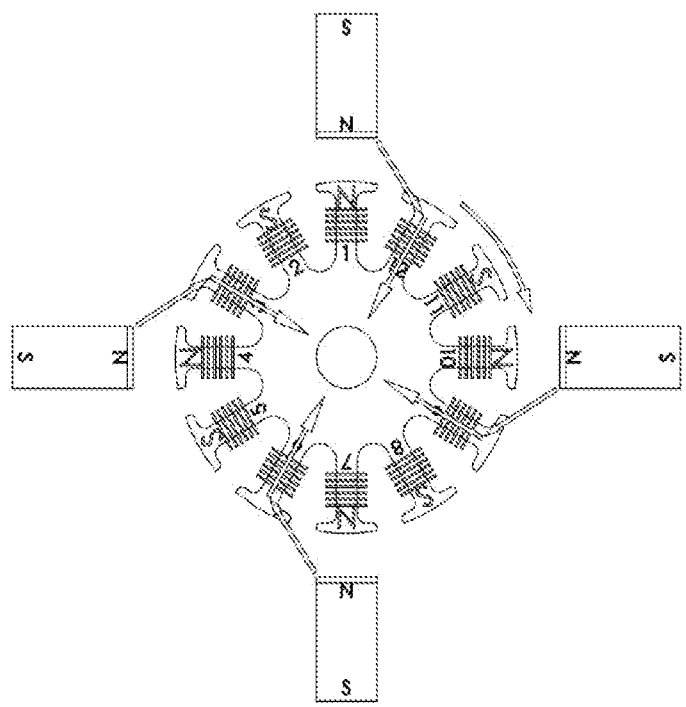
FIG. 46: the leakage of flux through fully expelled unenergized teeth of armature
Figure 47:
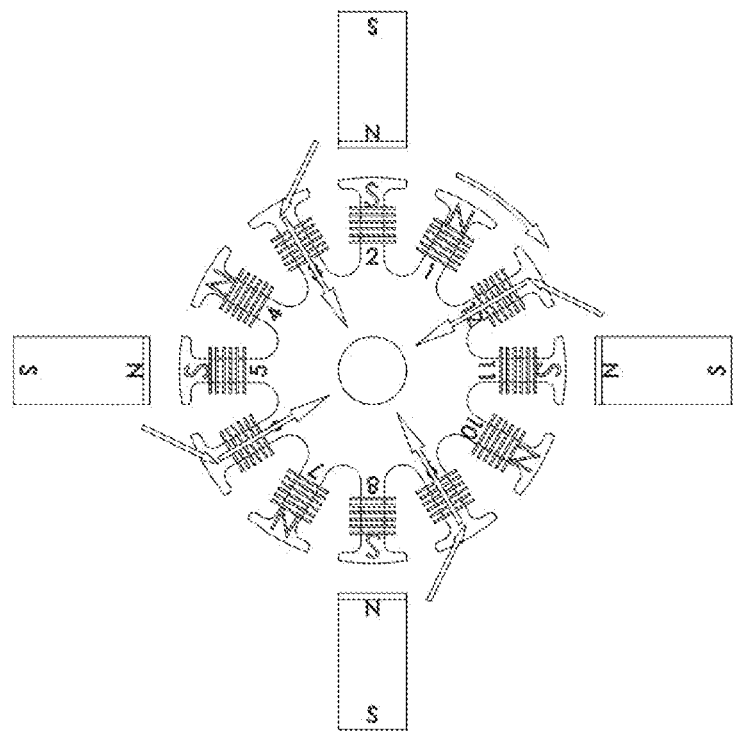
FIG. 47: the Leakage of flux through incoming unenergized teeth of armature

FIG. 44.1: In every one of the 4 working sets, the permanent magnet field pole attract the coming tooth of the armature; FIG. 44.2: The flux of the permanent magnet emits from the repelling tooth and repels its own pole; FIG. 44.3: The flux of the permanent magnet travels inside the joining iron between both teeth before it emits from the repelling teeth.

Matching and Opposing Forces Caused by Leakage of Flux in this Configuration

Potentially, there are three kinds of leakage of flux in this configuration.

Leakage of Flux Through Repelling Teeth of Armature

This is major leakage of flux in accordance with the experimental findings. Penetration of PM flux into the unsaturated part of the repelling teeth produces attraction force. This attraction force pulls the armature against the desired direction of rotation. Therefore, this attraction force is an opposing force. It balances (wastes) equivalent part of the repulsion force. Figure: 45

Leakage of Flux Through Fully Expelled Un-Energized Teeth of Armature

Some PM flux lines attract fully expelled un-energized teeth of the armature. It also produces opposing attractive force. Figure: 46

Leakage of Flux Through Incoming Un-Energized Teeth of Armature:

Some PM flux lines attract incoming un-energized teeth of the armature. It produces matching attractive force. Figure: 47

Neutralization of Leaked Flux

Figure 48:
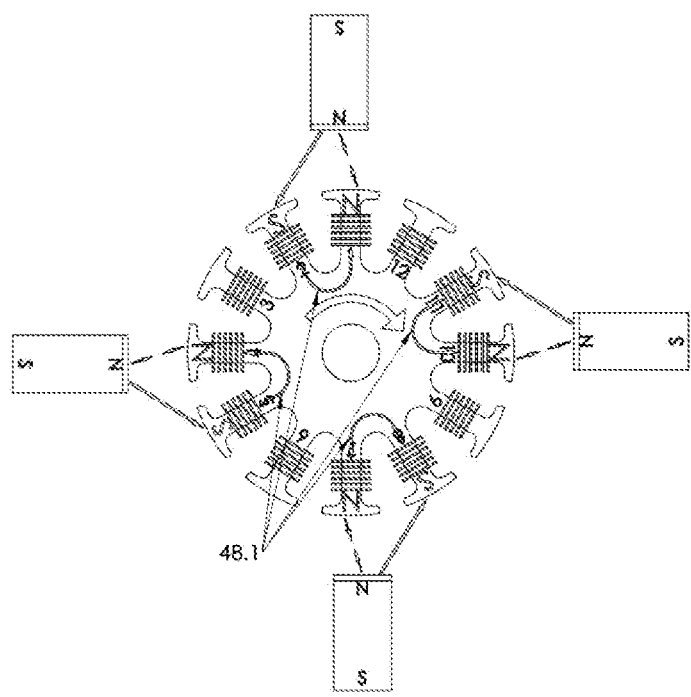
FIG. 48: four flows of dipolar flux inside the core
Figure 49:
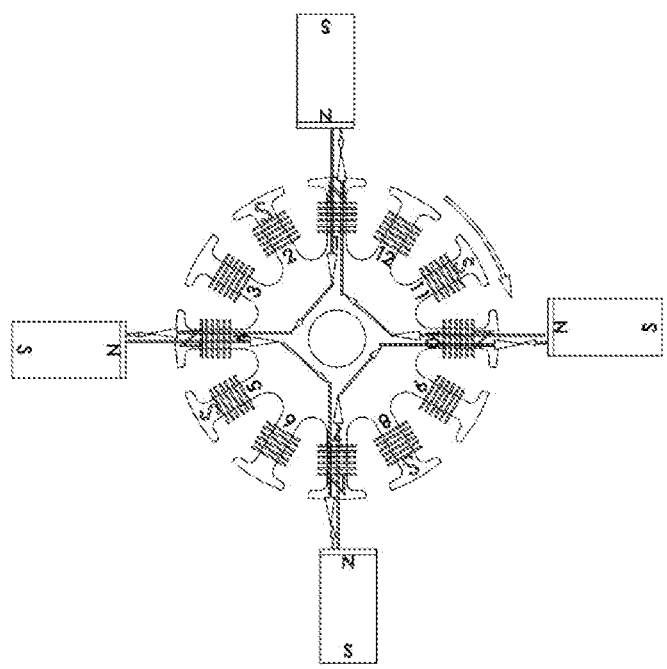
FIG. 49: the neutralization of leakage of flux caused by unsaturated part of repelling teeth
Figure 50:
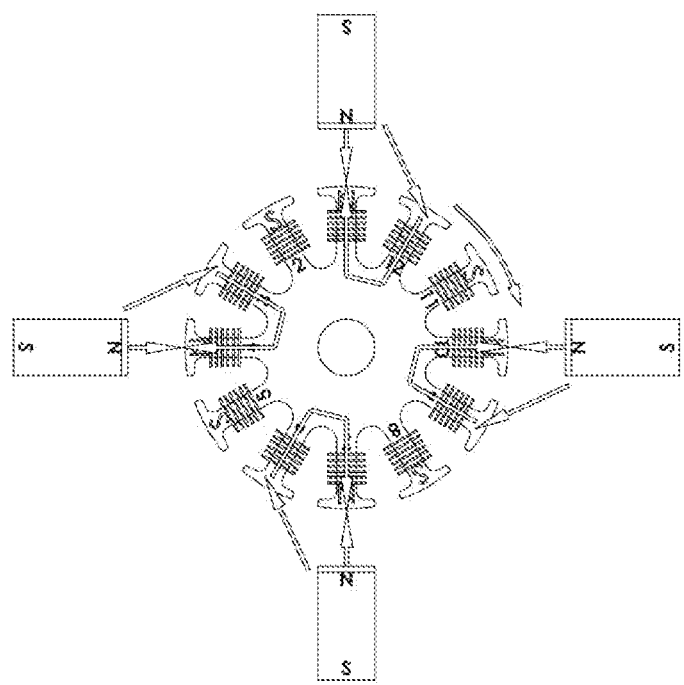
FIG. 50: the neutralization of leakage of flux through expelled teeth of armature
Figure 51:
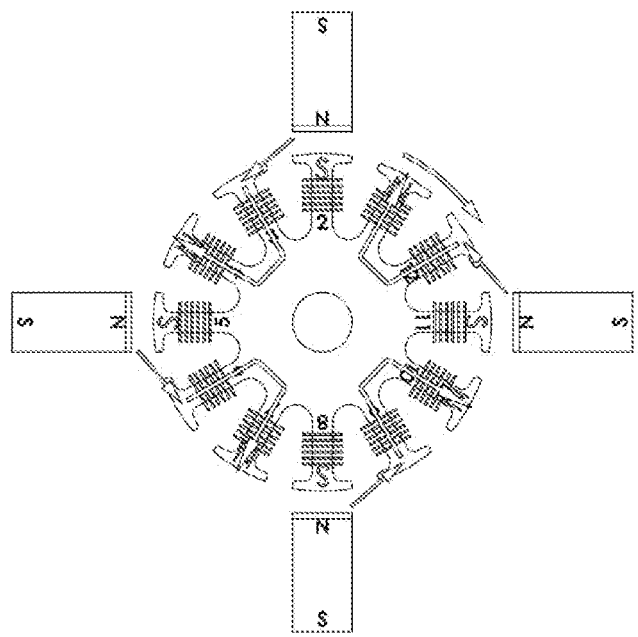
FIG. 51: the neutralization of leakage of flux through incoming teeth of armature

There are four flows of dipolar flux between unlike teeth, inside the core. Figure: 48 FIG. 48.1: 12 teeth four field poles make four working units The leaked flux would join any of the flow. This joining should strengthen outer North-poles and produce matching forces. Consequently, major part of leaked flux would produce opposing attraction while entering in one tooth and would produce matching repulsion while emanating from other teeth.

Finally, the major part of leaked flux should become neutral, if does not produce any matching force, instead of producing opposing force.

Neutralization of Leakage of flux through repelling teeth of iron, Figure: 49

Neutralization of Leakage of flux through expelled teeth of armature, Figure: 50

Neutralization of Leakage of flux through incoming teeth of armature, Figure: 51

Note: Any emission of leaked flux through unenergized teeth cannot produce any opposing or matching force as these teeth always remain out of active ranges of PM field-poles Testing of the Practicability of RR Magnetic Configuration The work of the whole configuration has been checked through 3 machines:
1. A fully functional rotary actuator
2. A trustworthy experimental device 3. A fully functional prototype (PM rotary motor)

The function of the actuator has been described in the part of background research.

The functions of the experimental device and fully functional prototype are described ahead.

Testing of the Configuration Through an Experimental Device

An experiment was designed and carried out to check the applicability of the whole RR Magnetic Configuration on rotary motion.

Material and Method

An experimental device was developed to carry out the experiment. This device could work either using dipolar field-poles magnetic configuration or like-field-poles magnetic configuration.

The stator of the device was made of aluminum. It contained two permanent magnet field poles.

The armature comprised 12 teeth.

Picture of the device, Figure: 52

Figure 52:
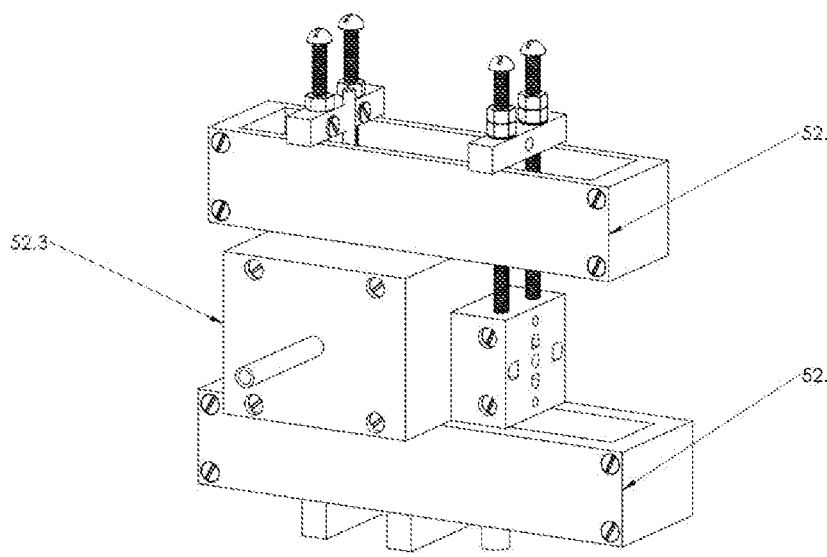
FIG. 52: the picture of the experimental device
Figure 53:
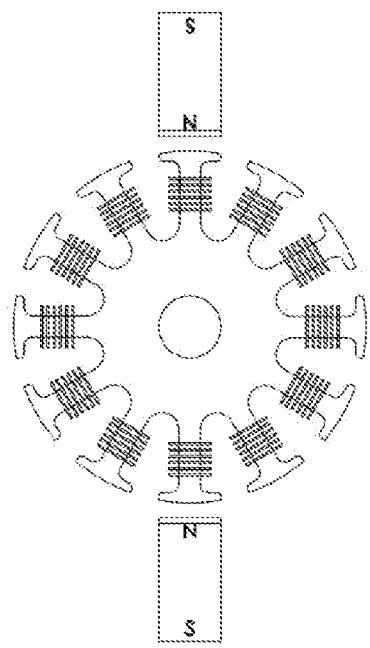
FIG. 53: the field-poles and armature configuration that was used in the experimental device

FIG. 52.1, 52.2: Machine parts to install two permanent magnets field poles; FIG. 52.3: Machine part to insert the armature fixed on a shaft Field-Poles and Armature Configuration, Figure: 53

Specifications

Armature

Diameter 1 9/16 inch. Length: 1 3/8. Number of slots=12. Weight of iron without shaft: 153 gram. Made of thin insulated iron sheets.

A shaft, made of brass was inserted in the armature. Size of shaft: diameter=3/8 inch. Length: 6 inch.

All teeth of this armature were winded/wired separately.

Winding: Insulated copper wire number33. Turns of wire per coil=90 coil resistance=0.4 ohm Permanent Magnets Two bar permanent magnets were added together to make a stronger field pole. Material: grade 33 SH Size of each permanent magnet: 8*8*34 mm. Magnetization: through 8 mm.

Total 4 permanent magnets to make two field poles

Iron Bar

An iron bar was added to the surface of each field pole. Material: soft iron; size: depth=3 mm*width=8 mm*length=34 mm Air Gap Air gap between field-poles and armature teeth: 1 mm The Experiment This experiment was carried out in two parts. Part A was carried out using like-field-poles configuration, and part 'B' was carried out using dipolar field-poles configuration. Each of the field-poles interacted with two dipolar electromagnetic poles.

The Function of Like-Field-Poles Configuration

When current was applied, a smooth and forceful rotary motion came into existence. No jerking occurred. The repelling tooth fully expelled from opposite side of the permanent magnet. Figure: 54

Figure 54:
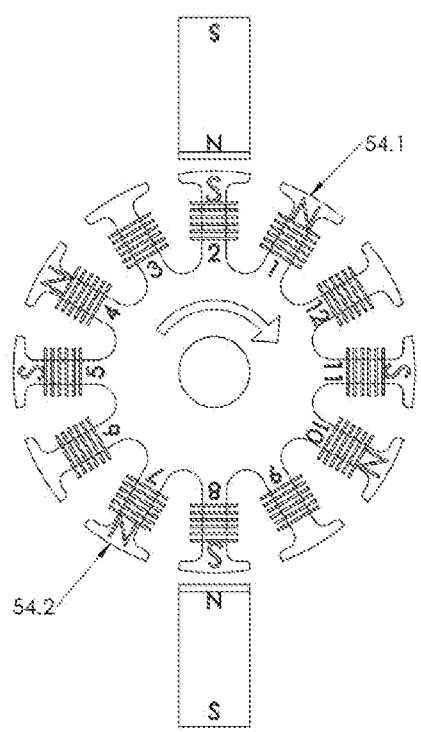
FIG. 54: the repelling tooth fully expelled from the permanent magnet

FIG. 54.1, 54.2: Smooth and full ejection of the repelling teeth of the armature from the like-pole permanent magnet field poles The Function of Dipolar Field-Poles Configuration Field-poles were set as dipoles. The electric connections were changed to set appropriate polarities of the electromagnetic teeth.

When the same current was applied, the armature teeth jerked to rotate but halted at a little more than half-crossed position. At least one third of repelling teeth remained under the permanent magnet. The half crossed repelling tooth needed hand force to fully expel from the permanent magnet; while the same current remained put-on. Figure: 55

Figure 55:
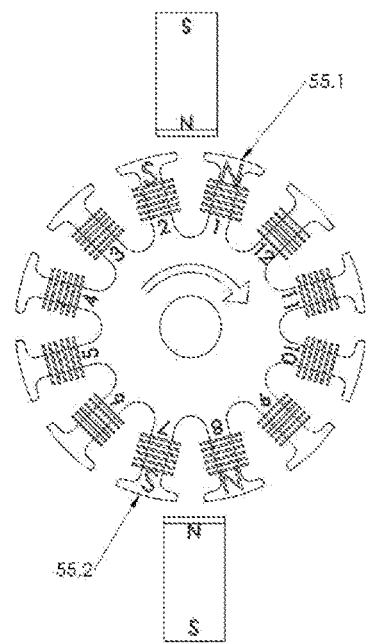
FIG. 55: at least one third of repelling teeth remained under the permanent magnet

FIG. 55.1, 55.2: The repelling teeth of the armature did not fully ejected from ordinary permanent magnet field poles Result Dipolar field pole configuration needed more force to release the repulsing tooth and to complete the full cycle of repulsion and attraction thus dipolar field-poles proved far less efficient than like-field poles.

Conclusion

The function of like— field pole configuration

Forceful expulsion of the repelling tooth was caused by a proper combination of heavy matching forces and neutralization of opposing forces.

Matching Forces

Heavy attraction force produced because of heavy PM field-poles and attracting teeth Tripled repulsion was produced due to:

1. Normal repulsion between the like poles of a PM and an electromagnet
2. Repulsion caused by the permeability that was added to the field poles
3. Repulsion caused by two-fold action of 'B' lines of like PM field-poles Opposing Forces Opposing force caused by the leakage of flux in the repelling tooth did not affect the rotation. Otherwise, at least the corner of the repelling teeth would not have fully ousted from the permanent magnet.

Opposing force caused by dipolar flow of flux between unlike field-poles did not exist to brake the rotation.

Testing of the Configuration Through a Fully Functional Prototype

A fully-functional prototype (PM rotary motor) has been built to check the whole function of RR Magnetic Configuration. Simple diagram of the motor, Figure: 56

Figure 56:
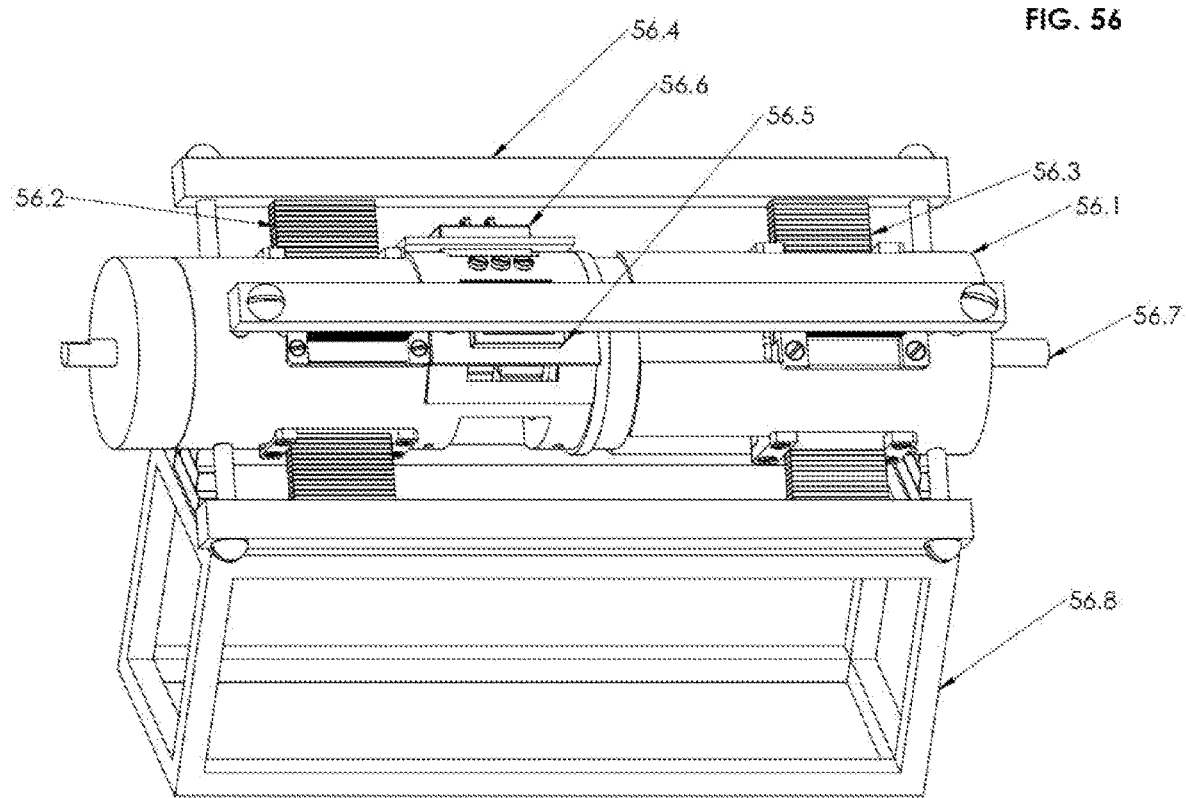
FIG. 56: simple diagram of the prototype
Figure 57:
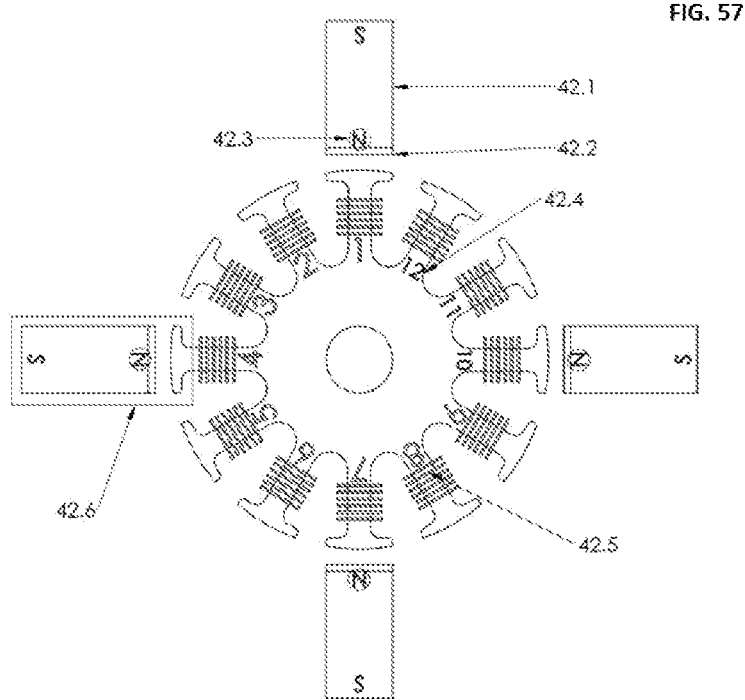
FIG. 57: diagram of one of the twin configurations used in the prototype
Figure 58:
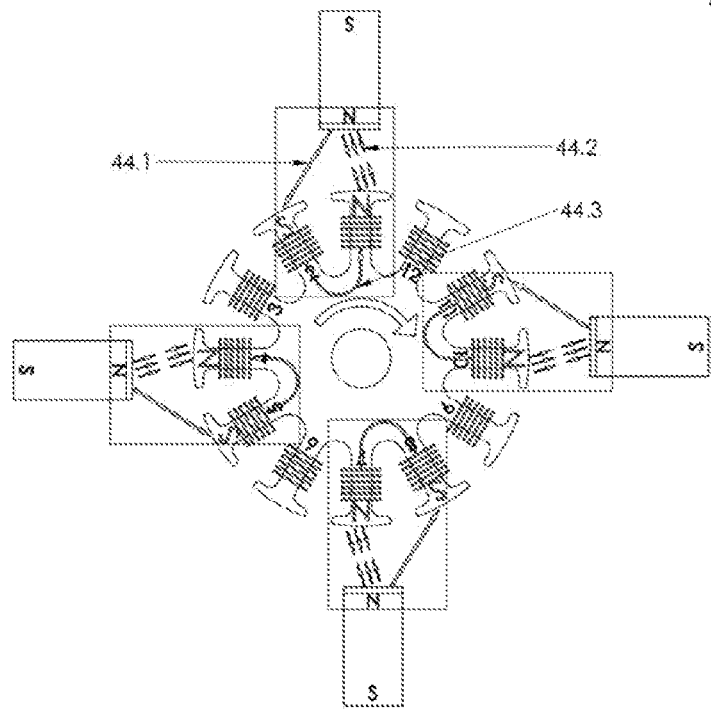
FIG. 58: creation of force in the prototype

FIG. 56.1: Stator of the motor; FIG. 56.2: One of the four North Poles field poles; FIG. 56.3: One of the four South Poles field poles; FIG. 56.4: One of four iron bars to shield the magnetic flux of outer poles of the permanent magnets; FIG. 56.5: One of the brush set; FIG. 56.6: 2' of the brush set; FIG. 56.7: Shaft of the rotor; FIG. 56.8: Stand Basic Structure This motor comprises a pair of 4-pole RR Magnetic Configurations. In other words, this motor comprises two armatures and 8 independent field-poles (like-field-poles). Each armature comprises 12 teeth. The same commutation system works for both armatures.

One of the armatures uses N-poles of permanent magnets and the other armature uses S-poles of permanent magnets as field poles; so that outer poles (that remain outside of the stator) could be connected through iron. If all outer permanent magnets are like poles, no flux path could be given and flux of all the outer like-poles will attract magnetic things from the surrounding.

Polarities of energized coils of both armatures have been set in accordance with the polarities of their respective field poles.

Energized teeth of an armature are repelled and attracted by North poles of permanent magnets while the energized teeth of the other armature are repelled and attracted by South poles of permanent magnets at the same time and to the same direction.

How RR Magnetic Configuration was Implanted in this Motor

1. Only like-poles of permanent magnet were used as field poles. Strong permanent magnets were used.

2. Iron pieces were mounted on the surface of the PM field-poles. A twelve teeth armature was used.
3. Cross sectional areas of PM poles and teeth were same sized. Each coil was independently connected to commutation system
4. 8 teeth out of 12 teeth of the armature were energized in such way that every third tooth remained unenergized.

Diagram of One of the Twin Configurations that were Used in this Motor, Figure: 57

Diagram of the second one of the twin configurations is also the same except the polarities of PM field-poles and armature teeth have been changed. However, the direction of the rotation of this configuration remains the same as first of the twin magnetic configurations. Creation of force in this motor, Figure: 58

Relation Between Ampere-Turn and PM Flux Density in this Motor

This motor was built around new scientific findings. Therefore, no equations were available to specify the proper relation between ampere-turn and PM flux density. I used experimental methods to set appropriate quantities of ampere-turn and PM flux density in this motor, such as:
1. I fixed PM flux and applied different amounts of current to the coils.
2. I fixed the current and applied different amounts of PM flux density.

Components

This motor comprises upon 5 parts
1. Stator
2. Rotor
3. Commutation
4. Iron bars fixed on outer poles of permanent magnets to provide flux path
5. Stand Stator Basic body of the stator: this body was made of aluminum. This was a cylinder-type body. Two bearing were installed on both sides of this cylinder for holding the rotor into it.

Necessary cuts were made on this cylinder to install field-poles and carbon plates.
1. Size of the basic body: length=12 inch, outer diameter=3 inch, inner diameter=41 mm
2. Shape of the basic body: Figure: 59

Figure 59:
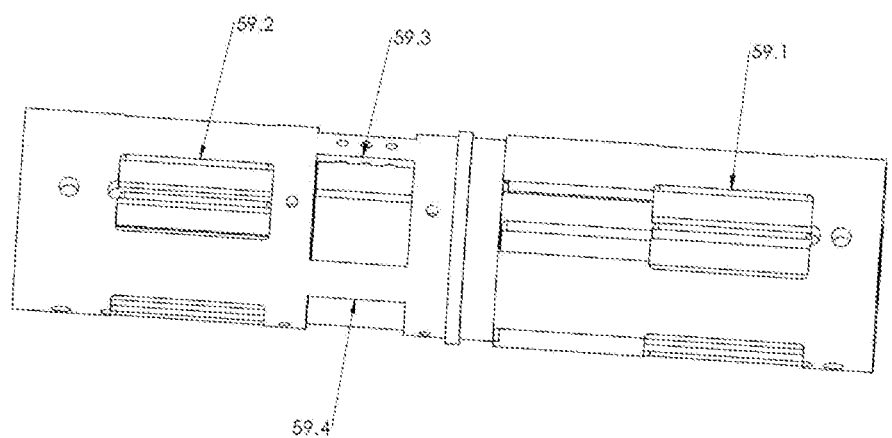
FIG. 59: shape of the basic body

FIG. 59.1: Four square holes to fix a set of four field poles; FIG. 59.2: Four holes made on the other side of the stator to fix the second set of four field pols; FIG. 59.3, 59.4: two holes for fixing two brush sets Field poles: in this motor, each armature used 4 field poles; while two armatures were the part of the rotor so total 8 field-poles were installed on the stator. 4 field-poles were installed on one side of the basic body and rest 4 field-poles were installed on the other side of the basic body.

Specification of Each Permanent Magnet Field Pole

Material: SH33. Size: 34 mm*24 mm*8 mm, magnetized through 24 mm (Note: because one piece permanent magnets of required size were not available, three small permanent magnets were combined to make a single field pole. Specification of each of the small pieces: Material: SH33. Size: 34 mm*8 mm*8 mm, magnetized through 8 mm)

Figure 60:
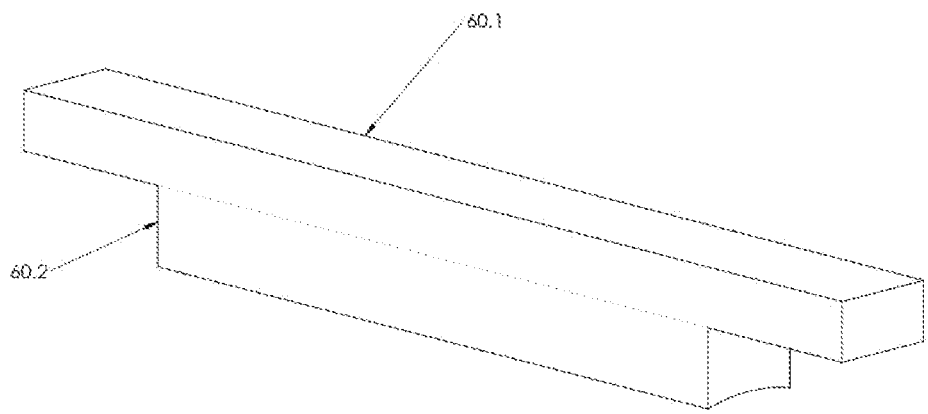
FIG. 60: an iron piece of special shape and size

Field Poles—Stator Fittings 8 special fitting devices were made to install the field-poles on the stator. Each of the fitting comprised three parts:
1. An iron piece of special shape and size: Figure: 60 FIG. 60.1, 60.2: Upper and lower parts of the iron pieces that were added to the field poles to add extra permeability
2. Two brass bars.
3. Supporting brass piece Complete fitting device, Figure: 61

Figure 61:
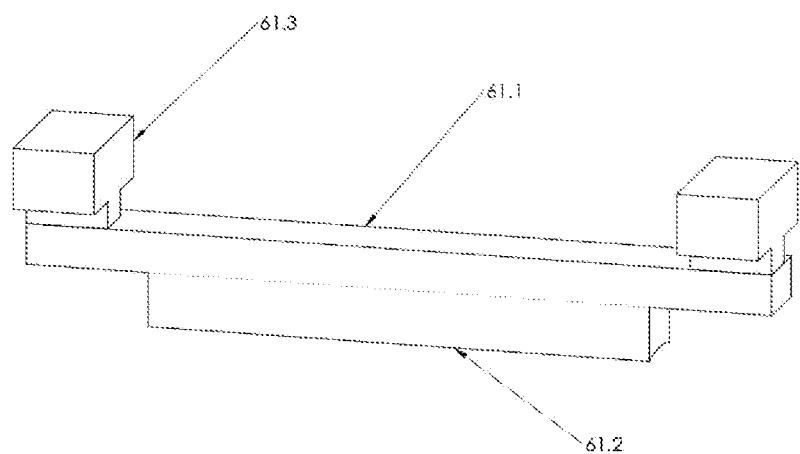
FIG. 61: complete fitting device

FIG. 61.1: One of the field pole to be fixed on upper part of one iron piece; FIG. 61.2: Lower part of the iron piece to be inserted into the stator; FIG. 61.3: Adjusting part of the iron piece made of brass Carbon and Carbon Plates Fittings 4 carbon brushes were needed to transfer current to all the working coils. The carbon holders were installed on the commutators with help of appropriate joining.

Iron Bars to Provide Flux Path Between the Unlike Poles that are Situated Outside of the Stator Four iron bars were installed on outer poles of the permanent magnets.

Installing of Field-Poles
1. All South poles of 4 permanent magnets were inserted into the fittings of one side of the basic body.
2. All North poles of 4 permanent magnets were inserted into the fittings of other side of the basic body. Figure: 62

Figure 62:
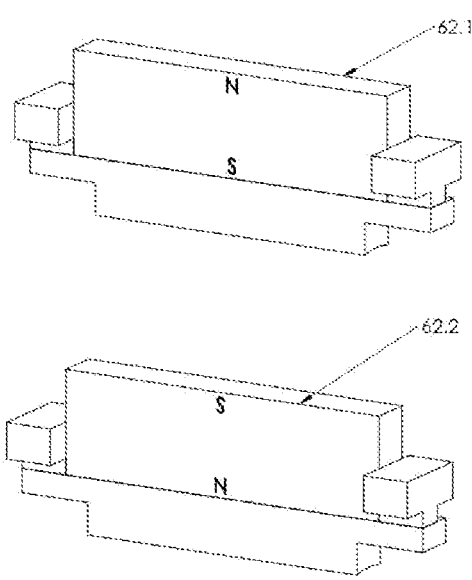
FIG. 62: all North poles of 4 permanent magnets were inserted into the fittings

FIG. 62.1: Polarity of all field pole of one set of the field poles is South; FIG. 62.2: Polarity of all field pole of 2' set of the field poles is North Rotor The rotor comprised upon two armatures and 2 commutators. All the 4 devices were installed on a shaft made of brass. Figure: 63

Figure 63:
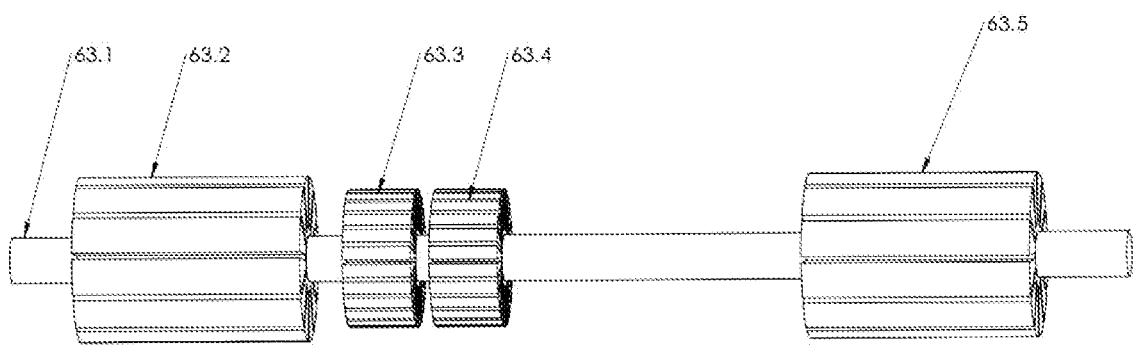
FIG. 63: the rotor comprised two armatures and 2 commutators
Figure 64:
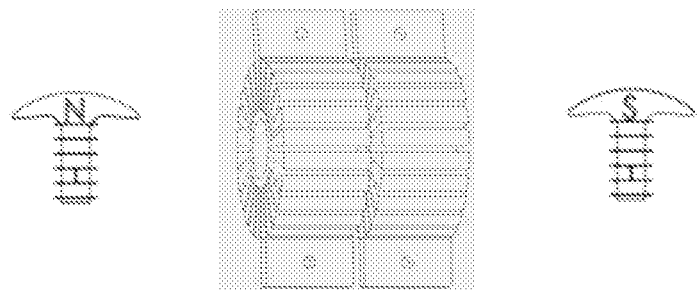
FIG. 64: commutation

FIG. 63.1: Shaft made of brass; FIG. 63.2: One of both the armatures; FIG. 63.3: One of the pair of the commutators; FIG. 63.4: $2^{nd}$ of the pair of the commutators; FIG. 63.5: $2^{nd}$ of both the armatures The Armatures and Commutators Each of the armatures had 12 teeth. Size: diameter=40 mm, Length=34 mm Each of the commutators had 24 segments. 12 segments were connected to the coils while 12 segments remained unconnected to put-off the current periodically.

On the shaft, appropriate tunnels were made under the commutators for the crossing of connecting wires.

All teeth of the armatures and all segments of the commutator were aligned.

Coiling of the Armature

Each teeth of the armature was coiled independently and separately. Each armature has 12 coils.

Wire and Turns

Insulated copper wire number 33. Turns of wire per coil=90 coil resistance=0.4 ohm Commutation Figure: 64

The use of two commutators was compulsory to energize a coil independently. Both ends of a coil were connected to two separate commutators. Both commutators were aligned to put the current on or off simultaneously.

4 coils of an armature were to attract the field-poles simultaneously and 4 coils of the armature were to repel the field poles simultaneously. Therefore, at one point of rotation, 4 coils needed one direction of current and 4 coils needed the other direction of current. At the next point, both sets of the coils needed changed direction of current. Therefore the ends of the wires of each set of 4 coils were joined to make only two ends of wires instead of 8 end of wire.

One segment of a commutator was connected to one end of a set of coils and next segment remained unconnected to any wire. When the carbon crossed the connected segment, the current passed to the coil; when the carbon crossed the unconnected segment, the current was disconnected. Each commutator was supplied current through two carbon-brushes.

Stand

An appropriate iron frame was made and fitted under the motor.

Efficiency

The efficiency of this motor is nearly 99% but most of the efficiency is hidden because of well known technical defects.

Present Efficiency

Present efficiency of the newly invented machine is at least 26%. The measurement is given in a table. Figure: 65

Immediately Recoverable Efficiency by Replacing Commutator Brushes with Electronic Sensors This machine needed a complicated commutation. Adequate engineering was not available here. Therefore, the commutator and carbon system could not be made properly. The installed commutator and carbon system is totally inadequate. It causes three kinds of losses in the prototype:
1. The commutator and carbon system causes heavy over resistance. The over resistant produces over voltage that causes power loss.
2. Long no-current periods happen during the operation of the machine. These periods produce a two-fold negative effect.
3. The system comprises upon two commutators and four carbon brushes. Friction loss of 4 brushes causes heavy loss of output power.

Loss Caused by the Over Resistance
a. Total resistance of the working coils of this machine is 0.25 but the inadequate commutator and carbon system increases the total resistance of the circuit to a great extent.
b. The total resistance through the commutator and carbon system becomes 1.30 instead of 0.25.
c. If the commutator and carbon system is replaced by electronic sensors, the unwanted resistance will be eliminated and original 0.25 ohm will be restored.
d. Only 5.915 Volts will be needed to apply the same amount of current to the coils instead of 9.6 volts.
e. Input power will decrease while output power will remain the same. Therefore, the efficiency of the motor will become 42% instead of 26%. Table: Figure: 66

The Loss of Output Power Caused by the Long No-Current Periods

30% part of a commutator segment area (copper+insulation) is no-current area. It means that when the armature rotates no current is applied to it during 30% part of the rotation. Occurrence of no-current periods affects the efficiency in two-fold manner:
1. Loss of the output power because of the wastage of the input power
   a. In fact the present output (8.85 Watts) is produced by only 70% of the input. 30% input never works. The meters show continuity of input power but the input remains paralyzed during 30% part of the rotation.
   b. If 8.85 Watts output power is produced by 70% of total input power, additional 3.792 watts output would be produced by the wasted 30% input.
   c. The output will become 12.642 watts instead of 8.85:
2. Loss of the output power because of the heavy braking effect caused by the heavy field poles
   a. During no-current periods the flux of the field-poles tries to stop the armature very forcefully.
   b. I estimate that total braking effect is at least 2 watts.
   c. If the braking effect is removed, the output will become=2+12.642=14.642 watts The Loss of Output Power Caused by Four Carbon Brushes
1. The commutator-brush system of this motor comprises two pairs of carbon-brushes.
2. The friction loss caused by the brushes is too heavy. It causes heavy loss of output power.
3. I estimate the loss is 20%. If this loss is removed, efficiency will jump 20% higher. This is a well-known loss. After this loss is removed, the output will be: 17.570 Watts.

Immediately Recoverable Efficiency by Eliminating Miscellaneous Technical Defects
1. This working model is, in fact, an experimental device. It has been converted into a working model after a lot of trial and error. So, there are many inherent manufacturing faults and mismatching in the model.
2. Material used in this motor is very cheap and inappropriate. Engineering of the motor is very old styled. The rotor is unnecessarily heavy, it weighs 850 gram. This heavy rotor is wasting a substantial part of the output power.
3. Coil and iron proportion is unsuitable in this machine. Bigger coils are needed. Bigger coils will strengthen magnetic fields of the armature.
4. I estimate that the miscellaneous losses are at least 3 watts. If these losses are removed, output power becomes: 3+17.570=20. 570 watts
5. The defects are easy to get rid of; all the mentioned defects are easily removable in a refined design. So, full output power is easily recoverable.

The Total of Present and Immediately Recoverable Efficiency

Total output=20. 570
Total input=20.7025
Total efficiency=20.570/20.7025=0.9935*100=99.35%

Proposed Refinements

Building of a refined model of this motor is needed.
Basically the refined model will be a PM BLDC motor.
RR Magnetic Configuration will be applied more efficiently to the proposed refined model.
All the detected defects would be eliminated by proper designing of the refined model.

Characteristics of this Motor

This is a cool motor. Very little Heat is produced in this motor because current is distributed in 16 coils out of total 24 coils of the twin-armatures.

Rotation of this motor is very smooth because RR Magnetic Configuration produces no cogging effect. Vibration and noise caused by No-current torque do not produce in this motor.

As repulsive and attractive forces are used in this motor very efficiently, power density of this motor inherently exceeds that of present motors. In present motors field-poles cannot participate effectively in building attractive and repulsive forces.

This motor remains extra efficient even at highly variable inputs (from 3 watts to 100 watts), and in highly underload conditions. This factor proves that this motor would remain extra efficient during part-load work; while the efficiency of present motors decreases dramatically during high underload conditions. Consequently, service factor of this motor extends unbelievably.

This motor fully utilizes no-cost attractive and repulsive forces of permanent magnet. This factor makes this motor inherently extra efficient.

Any kind of permanent magnets comprising any composition of materials can be used in this motor. This feature makes this technology widely affordable.

On one hand, cheap but larger motors can be made by using cheap permanent magnets for using in immobile machines such as water pumps and industrial machines where the cost and efficiency of the motor is more important than the energy density of the motor. On the other hand, very high energy density motors can be built using expensive magnets for mobile devices and machines such as electric vehicles. Both kinds of motors will always be extra efficient.

This motor can work using only repulsive force. In this case, only repelling electromagnetic poles are energized. This motor can also work using only attraction force. In this case, only attracting electromagnetic poles are energized.

At 33 watts input, the total present and immediately recoverable efficiency of this motor does not seem less than 99%. This amount of efficiency is astonishing because the efficiency of present small motors of the same power range remains between 25% and 50%.

Many scientists are of the view that mono field-poles configuration will prove inefficient like a homopolar motor. Present and immediately recoverable efficiency of this motor rejects the notion.

Validation of Extra Efficiency of RR Magnetic Configuration by the Function of the Motor Present and immediately recoverable efficiency and advantages of this motor proves RR Magnetic Configuration unparalleled, valid, extra-efficient, practicable and feasible.

Disadvantages of RR Magnetic Configuration

This configuration comprises open magnetic poles. Use of twin configuration eliminates this defect. This might be a mechanical disadvantage. However, this disadvantage can be eliminated by adopting alternative design as mentioned under the heading of 'Alternative designs'.

Maximum Potential Efficiency of RR Magnetic Configuration

This motor falls into mini power range. Even there are permanent losses in this motor like present motors, the present and potential efficiency of this motor is at least two times greater than that of present small motors.

Now a very important question arises: What will happen when large motors, that are already 97% efficient, would be built on RR Magnetic Configuration?

Present motors are made using only magnetic forces of repulsion and attraction created by current while the magnetic forces created by permanent magnets are ignored and are never used to strengthen the output.

RR Magnetic Configuration revitalizes attractive and repulsive forces of permanent magnet to participate vigorously in building the output power of a PM motor. Therefore, it is concluded logically that the efficiency of large motors would also jump very higher when the motors would be built on RR Magnetic Configuration. However, this is a very serious matter. This conclusion is totally against some settled notions in science and motor technology. Only the function of a large motor built on the novel configuration can decide about the validity of the conclusion.

Therefore, a large motor should first be built around RR Magnetic Configuration. I am determined to implant RR Magnetic circuit in a large motor as soon as possible.

Alternative Designs of the Prototype

1. In this motor, double armature is used only to provide flux path to outer like poles of the motor. However, motors comprising the RR Magnetic Configuration can be made using only one armature. In this case, the motor would need an extra iron casing to shield the flux of the outer-like-poles.
2. Even at lower current the motor works very well. It means that heavy repulsive force is produced in this motor. The heavy amount of the repulsion force reduces the need of higher current. Attractive force already does not need higher current. Therefore, for practical purposes, the related extracted experimental finding may be ignored in some alternative designs of the same motor.
3. In this motor, flow of flux between adjacent electromagnetic teeth remains going on. This flow must waste a reasonable part of magnetic force. Figure: 67

FIG. 67.1: Leakage of flux between two teeth

Major part of this loss can be prevented by widening the gap between the teeth. In this case, heavy PM field-poles would hardly allow the fluxes of the teeth to interact mutually.

However, the widened air gap between the teeth would also cause gaps between the productions of attractive and repulsive forces. This defect would have to be overcome by one means or another. Many electronic and electric techniques and devices are already available to fulfill this purpose. Number of PM field-poles and armature teeth may also be revisited.

The End

Researcher, inventor and technology developer, Umer Farooq

ORCID: 0000-0003-2372-0660

Email: umerfarooq.philos@yahoo.com, philos2100@yahoo.co.in

Phone: 923055563313 (SMS only please. Because I am a hard hearing person)

I claim:

1. A permanent magnet motor, comprising:
   a tubular stator with two ends;
   wherein, at least two permanent magnets are affixed inside the tubular stator, evenly placed along a circumference of a radial cross-section of the tubular stator;
   wherein, the at least two permanent magnets have same magnetic poles pointing toward a center of the radial cross-section, wherein the magnetic poles are of a first polarity;
   wherein, an iron piece is placed on a surface of each of the at least two permanent magnets;
   a rotor comprising a shaft, an armature, and a commutation system fixed on the rotor shaft;
   wherein, the armature comprising a plurality of teeth evenly placed along a circumference of the armature, each of the plurality of teeth comprising a radially placed electromagnet;
   wherein, controlled by the commutation system, the electromagnet is capable of switching to one of three states:
   a neutral state, indicating that the electromagnet is unenergized;
   an attractive state, indicating that the electromagnet is energized so that a second polarity of an outer end of the electromagnet is different from the first polarity;
   a repulsive state, indicating that the electromagnet is energized so that the second polarity of the outer end of the electromagnet is the same as the first polarity;

wherein the commutation system is operable to, a reference tooth in the plurality of teeth radially aligns with one of the at least two permanent magnets, cause the following:

the electromagnet on the reference tooth switches to a repulsive state;

the electromagnet on a preceding tooth switches to a neutral state;

the electromagnet on a succeeding tooth switches to an attractive state.

2. The permanent magnet motor of claim 1, wherein four permanent magnets are affixed inside the tubular stator.

3. The permanent magnet motor of claim 1, wherein the armature has twelve teeth.

4. The permanent magnet motor of claim 1, wherein the electromagnet on each of the plurality of teeth is connected to a DC power source.

5. The permanent magnet motor of claim 1, wherein commutation system includes two commutators, placed on each side of the armature.

6. The permanent magnet motor of claim 1, further comprising:

an iron casing housing the stator.

7. The permanent magnet motor of claim 1, further comprising:

two carbon holders placed inside the stator, each of the two carbon holders housing two carbon brushes.

8. The permanent magnet motor of claim 1, further comprising:

an iron stand supporting the stator.

9. The permanent magnet motor of claim 1, wherein the tubular stator is aluminum.

10. The permanent magnet motor of claim 1, wherein two bearings are respectively situated on the two ends of the tubular stator.

* * * * *